(12) United States Patent
Himeda et al.

(10) Patent No.: US 6,765,608 B1
(45) Date of Patent: Jul. 20, 2004

(54) IMAGE PROCESSING APPARATUS AND SYSTEM EXECUTING PREDETERMINED IMAGE PROCESSING ON IMAGE DATA SHOT BY CAMERA, AND IMAGE RECORDING MEDIUM RECORDED WITH IMAGE PROCESSING PROGRAM

(75) Inventors: Satoshi Himeda, Amagasaki (JP); Yasuhisa Kintou, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/520,216

(22) Filed: Mar. 7, 2000

(30) Foreign Application Priority Data

Mar. 9, 1999 (JP) .......................................... 11-061878
Mar. 19, 1999 (JP) .......................................... 11-076087

(51) Int. Cl.[7] ............................................. H04N 5/232
(52) U.S. Cl. ................................. 348/211.5; 348/14.01
(58) Field of Search ........................ 348/211.99, 211.4, 348/211.5, 211.6, 211.12, 239, 14.01, 14.08; 382/103, 115, 116, 117, 118, 181, 190

(56) References Cited

U.S. PATENT DOCUMENTS 5,199,081 A * 3/1993 Saito et al. ................. 382/116
5,438,357 A * 8/1995 McNelley ................... 348/14.1
5,715,325 A * 2/1998 Bang et al. .................. 382/118
6,233,006 B1 * 5/2001 Lee ............................. 348/143
6,456,729 B1 * 9/2002 Moore ......................... 382/103
2003/0048930 A1 * 3/2003 Mihara et al. ............... 382/118

FOREIGN PATENT DOCUMENTS

| JP | 6-121305 | 4/1994 |
| JP | 9-261607 | 10/1997 |
| JP | 10-136247 | 5/1998 |

* cited by examiner

*Primary Examiner*—Aung Moe
(74) *Attorney, Agent, or Firm*—Morrison & Foerster LLP

(57) ABSTRACT

An image processing apparatus includes a camera unit providing an image of a shot object, a marker detection unit detecting an object from the image output from the camera unit and comparing the configuration of the detected object with a predetermined configuration stored in a storage unit, and an image processing unit converting at least a partial region of the image output from the camera unit into an image differing from the output image when the configuration of the object is analogous to the predetermined configuration as a result of comparison by the marker detection unit. Since at least a partial region of the output image is converted according to the presence of an object in the output image, a particular region associated with the object, for example a region of a person in the image, can be converted.

19 Claims, 27 Drawing Sheets

EMITTED LIGHT

COLOR

CONFIGURATION (POLYGON)

EXCLUSIVE MARK

BAR CODE

EXCLUSIVE CODE PATTERN

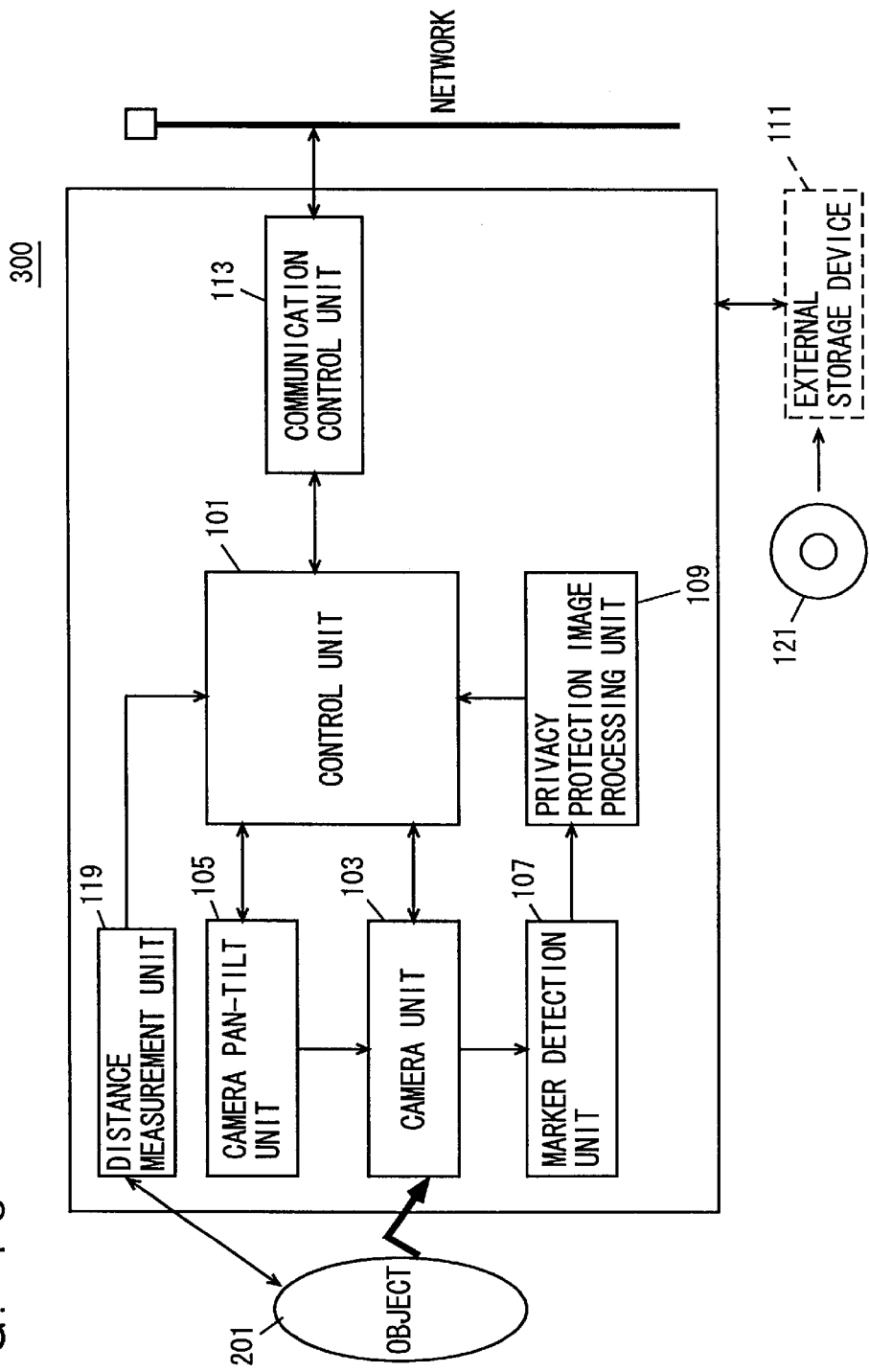

FIG. 16
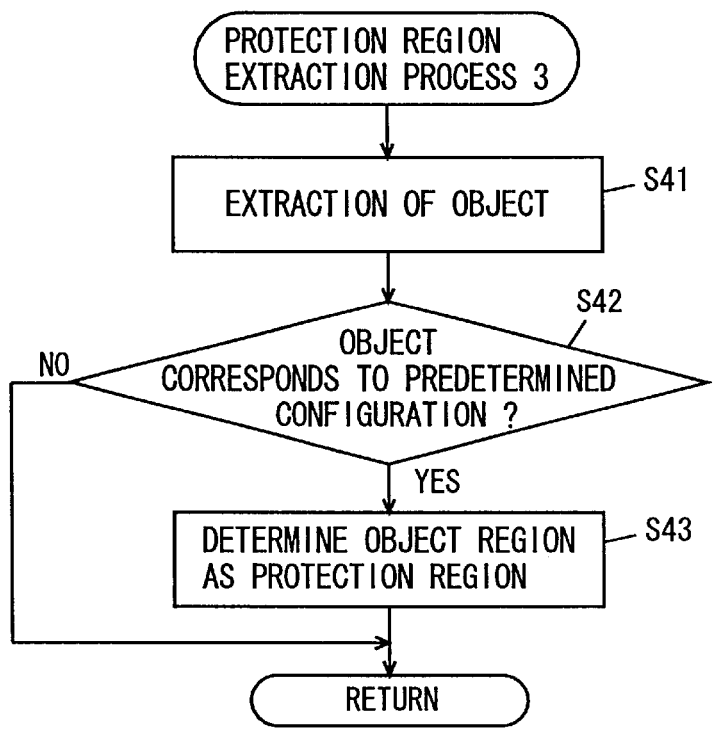
FIG. 17A  FIG. 17B
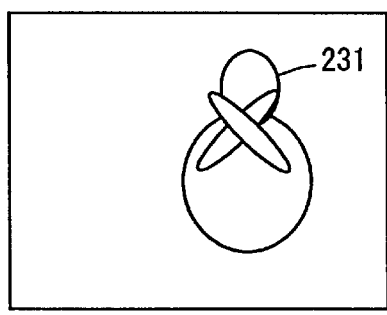 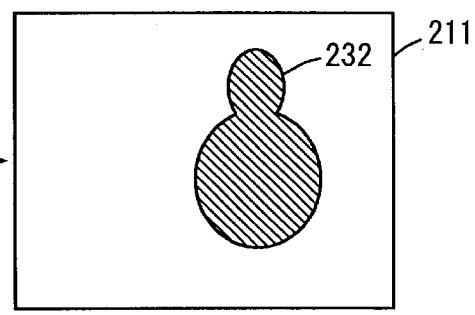

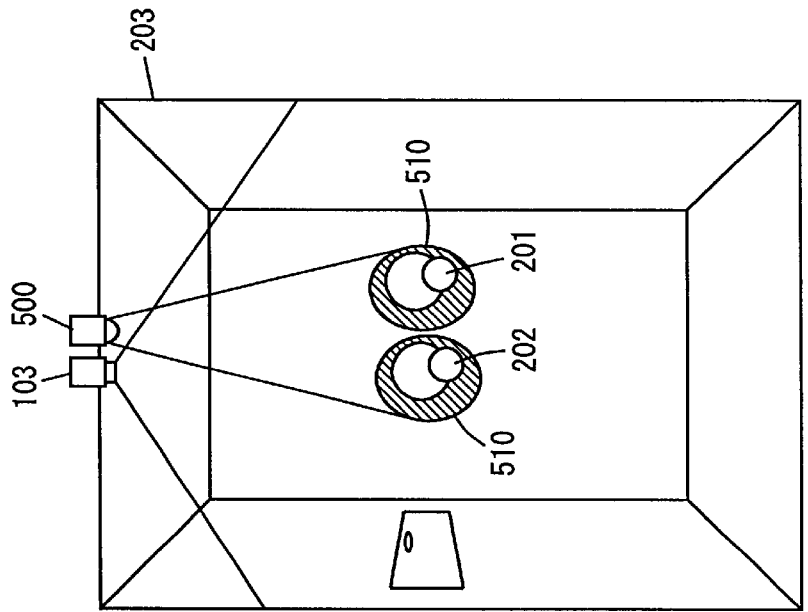
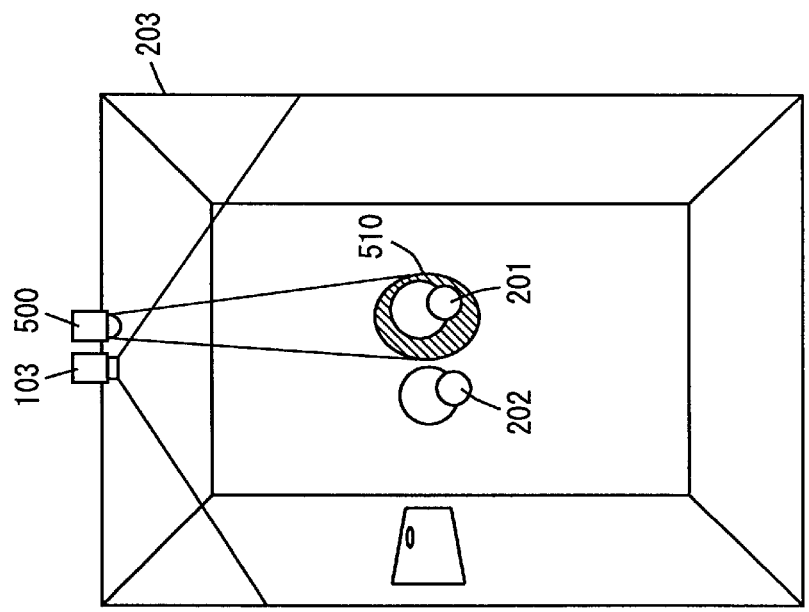

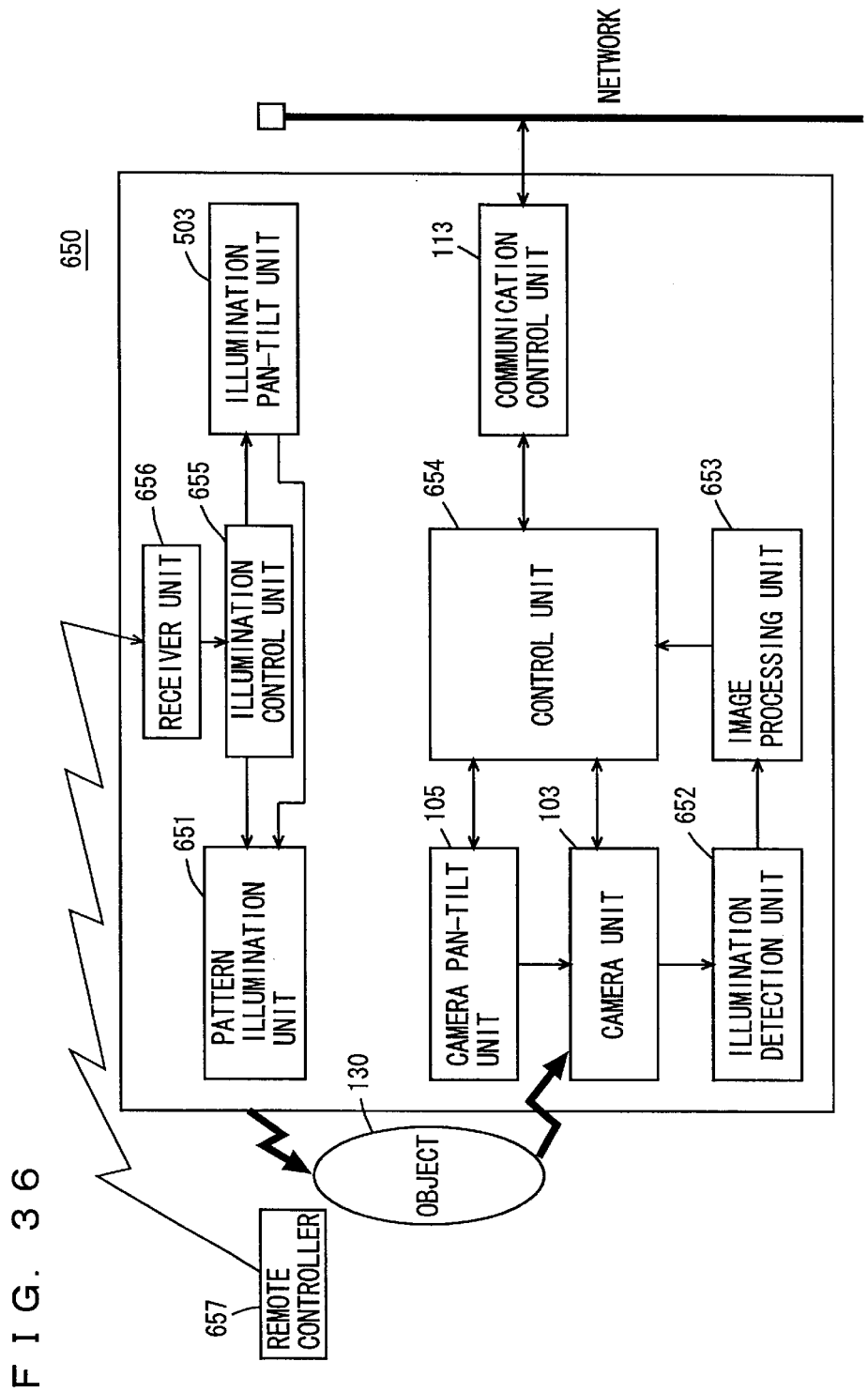

IMAGE PROCESSING APPARATUS AND SYSTEM EXECUTING PREDETERMINED IMAGE PROCESSING ON IMAGE DATA SHOT BY CAMERA, AND IMAGE RECORDING MEDIUM RECORDED WITH IMAGE PROCESSING PROGRAM

This application is based on Japanese Patent Applications Nos. 11-061878 and 11-076087 filed in Japan, the contents of which are hereby incorporated by reference.

BACKGROUND OF THE INVENTION

1. Field of the Invention

The present invention relates to an image processing apparatus, an image processing system, and a recording medium in which an image processing program is recorded. Particularly, the present invention relates to an image processing apparatus and system that carries out a predetermined image processing on a region where shooting is not permitted with respect to image data obtained by shooting through a camera, and a recording medium in which an image processing program is recorded.

2. Description of the Related Art

In accordance with the spread of recent network foundations and progress in communication technology, a system of transmitting and receiving video data or audio data of a remote monitor camera, a television telephone, and the like is now being developed. Particularly in a remote monitor camera system employing the Internet, one can view an image shot by a camera at a terminal installed remote from the place where the camera is set. In this system, control of the pan, tilt, zoom and the like of the camera can be controlled from the terminal connected to the network. The operator of the terminal can select arbitrarily the shooting range of the camera. The image shot by the camera can be viewed from a plurality of other terminals connected to the network. There are some systems that provide the video to unspecified users of the terminal. There is a problem that the privacy of an individual cannot be protected sufficiently in such remote monitor camera systems since the intention of the person who becomes the object of camera shooting is completely ignored.

Regarding this problem, Japanese Patent Laying-Open No. 10-136247 discloses a remote monitor camera system that sets a region that cannot be shot by a camera in a server that controls the camera. In this conventional remote monitor camera system, a region inhibited of shooting by a camera will not be shot and transmitted to a terminal connected to the network. The privacy of an individual located at a region that is inhibited in image pickup by a camera can be protected.

Also, Japanese Patent Laying-Open No. 6-121305 discloses a television telephone that inhibits shooting of the conversing person by closing the shutter of the camera or altering the direction of the camera that is provided to shoot the conversing individual.

The above conventional remote monitor camera system has the region set where shooting is not permitted according to the intention of the party controlling the camera (the shooting party). However, the privacy of the individual that becomes the object of shooting cannot be protected in the area other than the region where camera shooting is inhibited. The shot image can be displayed on a plurality of terminals connected to the network. Thus, privacy could not be protected respecting the intention of the individual that becomes the object of shooting.

In the above-mentioned conventional television telephone, the conversing person himself/herself will not be shot if he/she intentionally closes the shutter or alters the direction of the camera. In this case, the camera may shoot nothing or an image that contradicts the intention of the other party of conversation may be shot. It will no longer be possible to effect the simplest operation such as confirming whether there is a person present at that site or not. The conventional technique is not appropriate for the purpose of obtaining an image that is directed to security control.

SUMMARY OF THE INVENTION

In view of the foregoing, an object of the present invention is to provide an image processing apparatus, an image processing system and a recording medium recorded with an image processing program that can convert an image respecting the intention of the individual that becomes the object of shooting in the image or the intention of the party that is to protect that individual while minimizing disturbance of the shooter's intention.

According to an aspect of the present invention, an image processing apparatus includes an image input unit entering an image, a detection unit detecting an object from the image input through the image input unit, a storage unit storing a predetermined configuration in advance, a comparison unit comparing a configuration of the object detected by the detection unit with the predetermined configuration stored in the storage unit, and an image processing unit converting at least a region of the input image into an image differing from the input image when the configuration of the object is analogous to the predetermined configuration as a result of comparison by the comparison unit.

According to another aspect of the present invention, a computer readable recording medium is provided in which a program is recorded to cause a computer to execute the steps of storing in advance a predetermined configuration, entering an image, detecting an object from the input image, comparing a configuration of the detected object and the predetermined configuration stored in advance, and converting at least a region of the input image into an image differing from the input image when the configuration of the object is analogous to the predetermined configuration as a result of comparison.

According to a further aspect of the present invention, an image processing system includes an illumination device emitting light, an image input unit entering an image including the object illuminated by the illumination device, a detection unit detecting the illuminated object from the image input by the image input unit, and an image processing unit converting a region of the illuminated object by the detection unit into an image differing from the input image.

According to still another aspect of the present invention, a computer readable recording medium is provided in which a program is recorded to cause a computer to execute the steps of entering an image including an object illuminated by light of a predetermined wavelength range, detecting the illuminated object from the input image, and converting a region of the detected object into an image differing from the input image.

According to the present invention, an image processing apparatus, an image processing system, and an recording medium in which an image processing program is recorded can be provided that can convert an image according to the intention of the individual that is the object of shooting or the party that is to protect that individual while minimizing disturbance of the shooter's intention.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a block diagram showing a schematic structure of a camera server according to a second embodiment of the present invention.

FIG. 16 is a flow chart showing a flow of an extraction process of a protection region carried out by the privacy protection image processing unit of the camera server of the third embodiment.

FIGS. 17A and 17B show an image input to and an image output from the camera server of the third embodiment.

FIGS. 22A and 22B are diagrams to describe the illumination range of the illumination device.

FIG. 36 is a block diagram showing a specific structure of an image processing apparatus according to a fifth embodiment of the present invention.

DESCRIPTION OF THE PREFERRED EMBODIMENTS

First Embodiment

Figure 1:
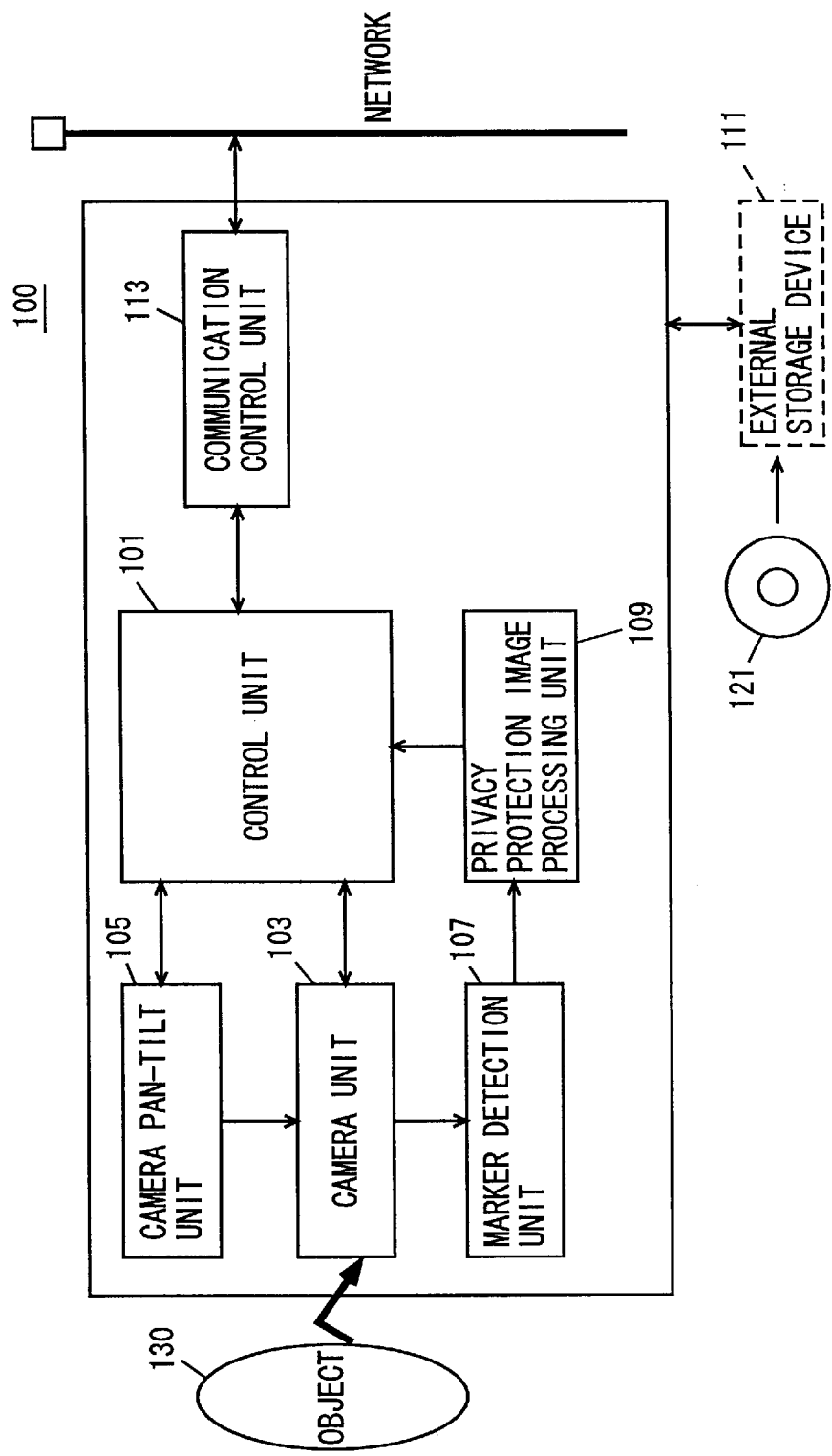
FIG. 1 is a block diagram showing a schematic structure of a camera server according to an embodiment of the present invention.

FIG. 1 is a block diagram showing a schematic structure of a camera server employed in an image input apparatus with an image processing function according to one embodiment of the present invention. Referring to FIG. 1, a camera server 100 includes a camera unit 103 to shoot an object 130, a camera pan-tilt unit 105 to shift the shooting direction of camera unit 103 vertically and horizontally, a marker detection unit 107 detecting a marker from an image shot by camera unit 103, a privacy protection image processing unit 109 to apply a predetermined image process on an image shot by camera unit 103 according to the marker detected by marker detection unit 107, a communication control unit 113 to carry out communication with another computer connected to the network, and a control unit 101.

Camera unit 103 is formed of an optical lens and a photoelectric conversion element and the like such as a charge coupled device (CCD). The image shot by camera unit 103 is converted into an electric signal by the photoelectric conversion element and transmitted to marker detection unit 107. The focus, zoom and iris control of camera unit 103 is determined according to a control command received from control unit 101. Camera pan-tilt unit 105 shifts the shooting direction of camera unit 103 vertically and horizontally. Camera pan-tilt unit 105 carries out the pan and tilt movement according to a control command received from control unit 101. Accordingly, the shooting direction of camera unit 103 is shifted vertically and horizontally.

Communication control unit 113 is a communication interface to connect camera server 100 with a computer network or a communication line network to carry out communication with another personal computer connected to the network and the like. FIG. 1 illustrates the structure connected to a computer network. Audio data or image data input to communication control unit 113 is transmitted to a personal computer connected to the network via the network through a command of control unit 101.

Control unit 101 provides the entire control of camera server 100. Control unit 101 effects communication with another computer or the like connected to the network via communication control unit 113 to receive a command modifying the range to be shot by camera unit 103. In response to the received command, control unit 101 transmits a control command to camera unit 103 and camera pan-tilt unit 105. Camera pan-tilt unit 105 alters the shooting direction of the camera unit 103 according to the control command received from control unit 101. Camera unit 103 determines the focus value, the zoom amount, and the iris value according to the control command received from control unit 101. Accordingly, the range to be shot by camera unit 103 is controlled.

Marker detection unit 107 receives an image shot by camera unit 103. A marker is stored in advance in marker detection unit 107. Marker detection unit 107 collates the configuration extracted from the image received from camera unit 103 with the stored marker configuration to detect a region of a configuration analogous to the configuration of the marker from the image (referred to as "marker region" hereinafter). The marker stored in marker detection unit 107 is the configuration of a character, symbol, or color, or a configuration represented by a combination thereof The marker will be described in details afterwards.

Privacy protection image processing unit 109 receives the image shot by camera unit 103 from marker detection unit 107 and also the marker region detected by marker detection unit 107. A protection region is extracted from the image on the basis of the received marker region. A predetermined image process is applied on the extracted protection region. The image subjected to the image process is transmitted to control unit 101.

At control unit 101, the image subjected to the image process received from privacy protection image processing unit 109 is transmitted to the computer or the like connected to the network via communication control unit 113. Accordingly, the computer or the like connected to the network can provide display of an image subjected to image processing at privacy protection image processing unit 109.

The program to execute the process carried out by marker detection unit 107 and privacy protection image processing unit 109 is recorded in a recording medium 121. The program can be executed at control unit 101 by reading in the recorded program using an external storage device 111 connected to camera server 100. Recording medium 121 is a magneto-optical disk, a digital video disk (DVD), or the like.

Figure 2:
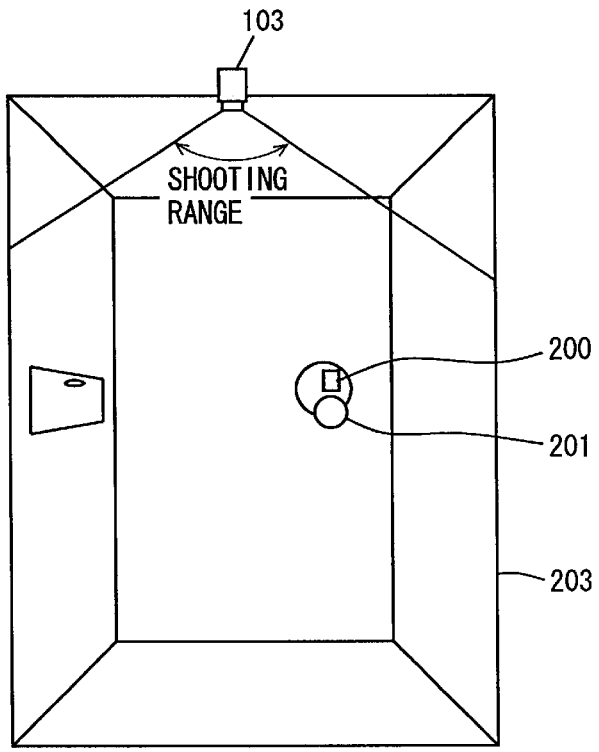
FIG. 2 is a diagram to describe a shooting range of a camera unit in shooting a room with the camera unit of the camera server according to a first embodiment of the present invention.

FIG. 2 is a diagram to describe the shooting range of camera unit 103 in shooting a room with camera unit 103.

FIG. 2 shows a room 203 viewed from above. An object 201 with a marker 200 attached to his/her chest is present at substantially the center of room 203. Camera unit 103 is attached at an upper portion of one wall of room 203. The shooting range that can be shot by camera unit 103 covers the room at the angle shown in FIG. 1. Since object 201 resides in the shooting range of camera unit 103, object 201 is included in the image shot by camera unit 103. A certain region at the proximity of the wall to which camera unit 103 is attached is not included in the shooting range. The region not included in the shooting range can be made to be included in the shooting range by the pan and tilt movement of camera pan-tilt unit 105.

Figure 3:
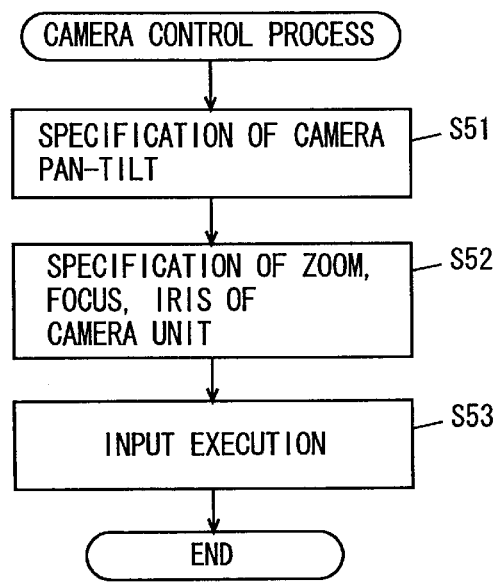
FIG. 3 is a flow chart showing a camera control process carried out by the control unit of the camera server of the first embodiment.

The camera control process carried out by control unit 101 will be described with reference to the flow chart of the camera control process of FIG. 3. Control unit 101 carries out communication with a computer or the like connected to the network via communication control unit 113. The command received from the computer includes a command to specify modification of the shooting direction of camera unit 103, and a command to specify adjustment of the zoom, focus, iris of camera unit 103. Control unit 101 converts the commands transmitted from the computer or the like into control commands. These control commands are transmitted to camera pan-tilt unit 105 and camera unit 103. Accordingly, camera pan-tilt unit 105 and camera unit 103 are under control of control unit 101.

Upon receiving a command altering the shooting range of camera unit 103 from the personal computer or the like, control unit 101 transmits a control command to camera pan-tilt unit 105 (step S51). Camera pan-tilt unit 105 carries out a pan movement or a tilt movement according to the received control command. Accordingly, the shooting range of camera unit 103 is shifted leftwards or rightwards and upwards or downwards.

Upon receiving a command to adjust the focus, zoom, and iris of camera unit 103 from a personal computer or the like, control unit 101 transmits a control command to camera unit 103 (step S52). In response, camera unit 103 carries out an operation to adjust the focus, zoom, and iris corresponding to the received control command.

By driving camera unit 103, shooting is initiated by camera unit 103 (step S53). The image shot by camera unit 103 is transmitted to marker detection unit 107.

Figure 4:
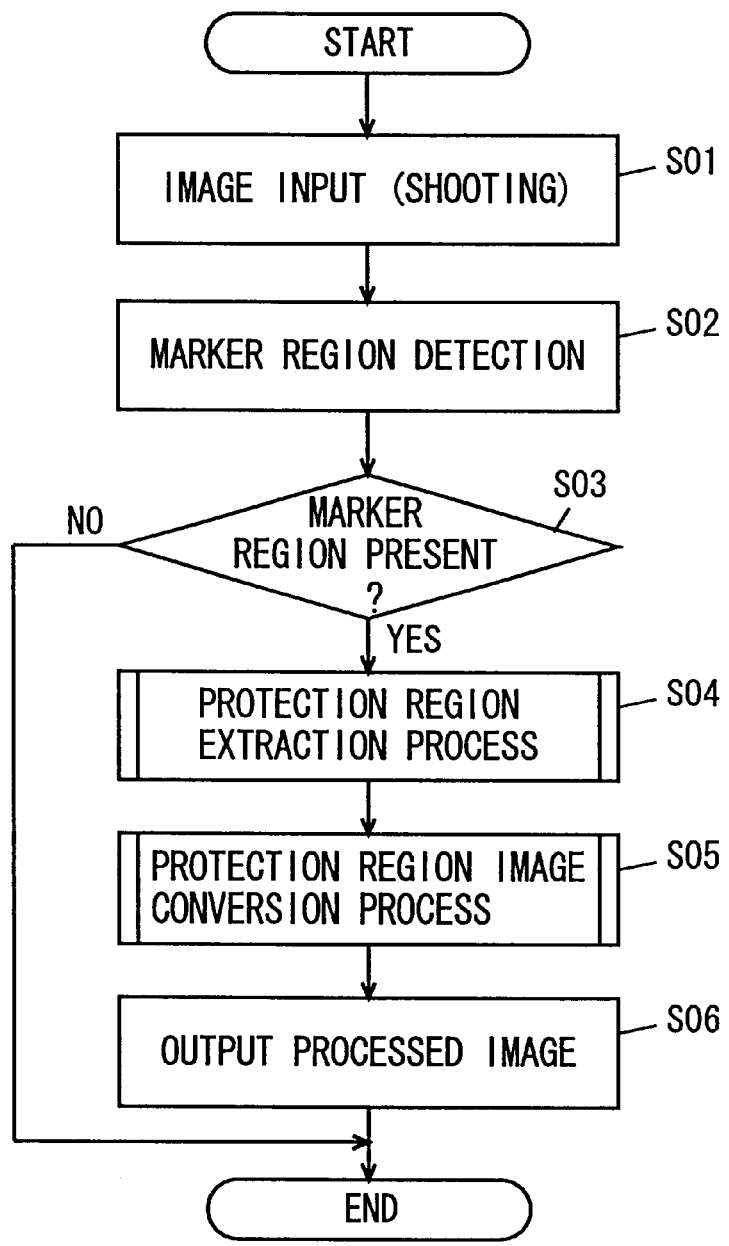
FIG. 4 is a flow chart showing a flow of an image process carried out by a marker detection unit and a privacy protection image processing unit of the camera server of the first embodiment.

FIG. 4 is a flow chart showing the flow of the image process carried out by marker detection unit 107 and privacy protection image processing unit 109. Referring to FIG. 4, the image process includes the step of entering the image shot by camera unit 103 (S01), the step of detecting a marker region from the image (S02), the step of determining whether a marker region is included or not in the image (S03), the step of carrying out the process of extracting a protection region from the image (S04), the step of carrying out the process of converting the image of the protection region extracted at step S04 into a predetermined image (S05), and the step of providing the image converted at step S05 (S06).

At step S01, the image shot by camera unit 103 is input to marker detection unit 107. The input image may be a still image or a motion picture.

By collating the input image with the marker stored in marker detection unit 107 at step S02, an image region of a configuration analogous to that of the marker is detected from the image. When there are a plurality of markers stored in marker detection unit 107, collation is carried out with respect to each marker.

The well-known image recognition technique can be employed in the method of detecting a marker region. For example, by binarizing the image using luminance or color hue and extracting the contour of the object included in the image, the configuration of the object can be recognized. An image region of a configuration analogous to the configuration of the marker is detected as the marker region by comparing the configuration of the recognized object with the configuration of the marker stored in marker detection unit 107.

Detection of a marker region from an image corresponds to the case where, for example, an person having a marker of a configuration identical to that of the marker stored in marker detection unit 107 attached to his/her chest enters the shooting range of camera unit 103. In this case, that person is included in the image shot by camera 103 as the object, and the marker attached to that person's chest is also included in the image shot by camera unit 103.

At step S03, determination is made whether a marker region has been detected from the image. When a marker region has been detected, control proceeds to step S04. When a marker region has not been detected, control ends without carrying out the following process.

At step S04, a process of extracting a protection region to protect the privacy from the image is carried out. At step S05, an image conversion process is carried out on the image of the protection region extracted at step S04. The process carried out at steps S04 and S05 will be described in detail afterwards.

At step S06, an image that is subjected to the image conversion process at step S05 is output to control unit 101. Control unit 101 provides the processed image output from privacy protection image processing unit 109 to communication control unit 113.

Communication control unit 113 transmits the processed image to a personal computer or the like connected to the network. The personal computer or the like connected to the network displays the received image on a display means such as a CRT or a liquid crystal display connected to the personal computer.

Figure 5:
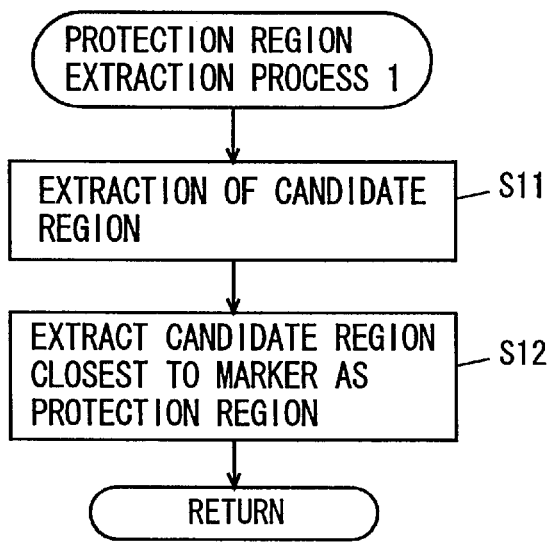
FIG. 5 is a flow chart showing a flow of an extraction process of a protection region carried out at step S04 of FIG. 4.

FIG. 5 is a flow chart showing the flow of a protection region extraction process carried out at step S04 of FIG. 4. Referring to FIG. 5, the protection region extraction process includes a step (S11) extracting a candidate region, and a step (S12) extracting the protection region out of the candidate regions extracted at step S11 that is closest to the marker.

At step S11, the region of the face area of a person is extracted as the candidate region from the object included in the image. This is carried out by, for example, a method of extracting the region of the skin color area from the image. This is because the probability is high of the region of the skin color area representing the face of a person.

At step S12, the distance between the position of the candidate region extracted at step S11 and the position of the marker region detected at step S02 of FIG. 4 in the image is calculated. In the case where a plurality of candidate regions are extracted at step S11, the distance from the position of the marker is calculated for all of the candidate regions. Then, the candidate region having a distance from the marker region that is most closest is extracted as the protection region. Accordingly, the region of a face closest to the marker region is extracted as the protection region in the image. In other words, the area of the person's face with the marker attached to his/her chest is extracted as the protection region.

In the case where a plurality of marker regions are detected from the image at step S02 of FIG. 4, a plurality of protection regions will be extracted at step S12 of FIG. 5. In other words, a plurality of protection regions corresponding in number to the detected marker regions is extracted. Therefore, all the faces of the persons with the marker will be extracted as the protection region when there are a plurality of individuals with the marker attached to his/her chest in the image.

Figure 6:
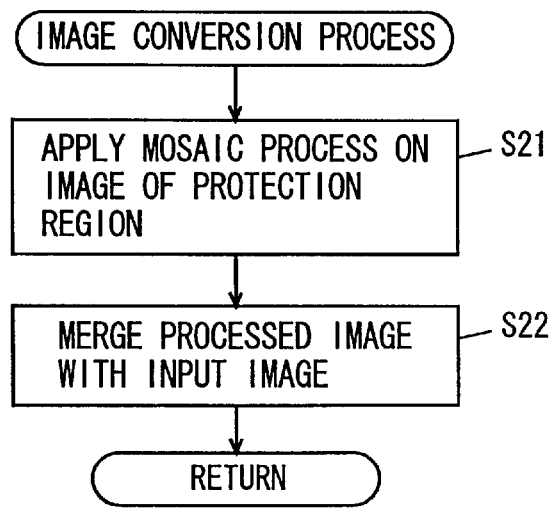
FIG. 6 is a flow chart showing a flow of an image conversion process carried out at step S05 of FIG. 4.

FIG. 6 is a flow chart showing an image conversion process carried out at step S05 of FIG. 4. Referring to FIG. 6, the image conversion process includes a step (S21) of carrying out a mosaic process on the image of the extracted protection region, and a step (S22) of carrying out the process of merging the image of the protection region subjected to the mosaic process with the image input from camera unit 103.

At step S21, a mosaic process is carried out on all the protection regions extracted at step S12 of FIG. 5. Accordingly, the image of the protection region is converted into an image in which the object cannot be particularly identified. A filter process such as a look up table (LUT) conversion can be employed instead of the mosaic process. Furthermore, another image data can be prestored in privacy protection image processing unit 109 to substitute the image of the protection region.

At step S22, the image of the protection region that is subjected to a mosaic process and no longer allowing identification of the object is merged with the input image. Accordingly, only the image of the protection region out of the input image will correspond to an image subjected to a mosaic process. Since the image other than the protection region of the merged image corresponds to the former image, any person in the remaining region can be recognized.

Figure 7A:
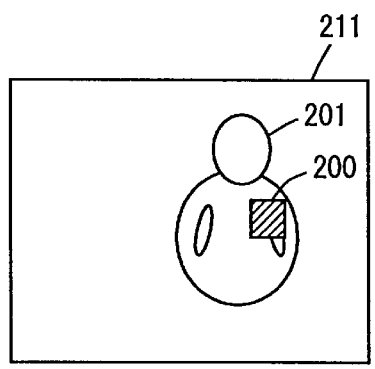
FIGS. 7A and 7B show an image input to and an image output from the camera server of the first embodiment.
Figure 7B:
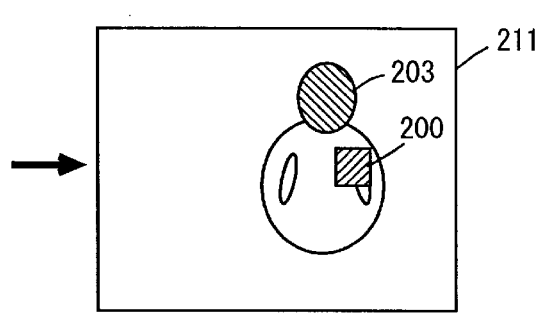

FIG. 7A shows an image shot by camera unit 103 and FIG. 7B shows an image output from camera server 100. Referring to FIG. 7A, an image 211 shot by camera unit 103 includes an object 201 that is a person and a marker 200. Object 201 is illustrated with the configuration of the person deformed. Referring to FIG. 7B, the area of the face of the object is represented as protection region 203 subjected to a mosaic process.

Figure 8:
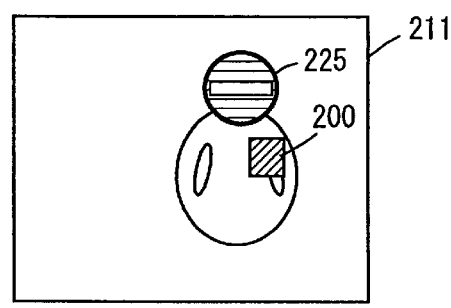
FIG. 8 shows a modification of an image output from the camera server of the fist embodiment.

FIG. 8 shows a modification of an image output from camera server 100. Referring to FIG. 8, a label 225 indicating that the area of the face of the object is a protection region is displayed in an overlaid manner on the area of the face of the object. By displaying a label 225 overlaid on the area of the face of the object extracted as the protection region, an image can be provided to the person viewing image 211 negating recognition of who the object is in image 211. It also provides the recognition that the object in image 211 requests protection of privacy.

Figure 9A:
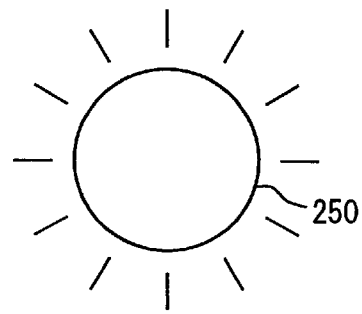
FIGS. 9A–9F show specific examples of markers.

FIGS. 9A–9F show specific examples of a marker. FIG. 9A shows a light-emissive marker 250. A light emitting element such as a light emitting diode can be employed as the emissive marker. At marker detection unit 107, the marker can be detected by detecting the color of light emitted from the marker. Also, the marker can be detected by extracting the luminance information from the image and identifying the configuration of the region that has a suddenly high luminance.

Figure 9B:
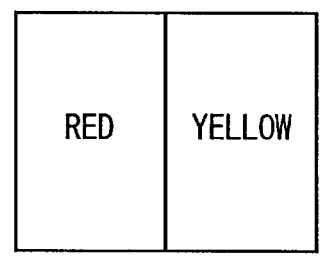

FIG. 9B shows a marker corresponding to a combination of different colors. The marker is formed by the combination of a red rectangle and a yellow rectangle. Marker detection unit 107 detects a marker by detecting the change in color.

The accuracy of detecting the marker can be improved by detecting a marker depending upon a combination of color and configuration.

Figure 9C:
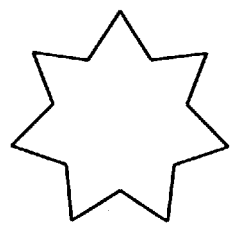

FIG. 9C shows a stellate marker. At marker detection unit 107, the stellate marker can be detected by employing the above-described method of recognizing the configuration to detect the marker. The marker of FIG. 9C has a regular shape. The accuracy of detecting the marker can be further improved by a marker taking an irregular configuration.

Figure 9D:
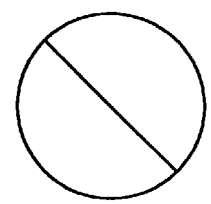

FIG. 9D shows a marker that is exclusive. This exclusive mark is a marker that is valid for only one camera server.

Figure 9E:

FIG. 9E shows a marker represented by a bar code. By using a bar code as the marker, the contents of the image process carried out can be altered depending upon the detected marker. For example, the mosaic process can be applied to only the area of the face when a certain bar code is detected and a mosaic process can be applied to an area larger than the area of the face when another bar code is detected.

Figure 9F:
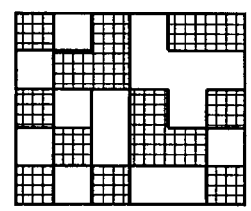

FIG. 9F shows a marker applying an exclusive code pattern such as a two dimensional bar code. By using an exclusive code pattern as the marker, an effect similar to that where a bar code is employed as a marker can be obtained.

The camera server of the present embodiment applies a mosaic process on the region of a person's face closest to the marker, when included in the image, in the image shot by camera unit 103. Accordingly, an image is merged that negates the detailed identification of the person corresponding to the face of the person with the marker for output. As a result, the shooting range of camera unit 103 will not be limited, and an image corresponding to the intention of the shooter side can be output. An image that has the privacy of the person with the marker protected can be provided.

The mosaic process can be applied only on the region required for privacy protection. Therefore, the amount of information of the output image will not be reduced.

Second Embodiment

A camera server applied with an image input apparatus including image processing function according to a second embodiment of the present invention will be described hereinafter. FIG. 10 is a block diagram showing a schematic structure of a camera server 300 according to the second embodiment. Camera server 300 of the second embodiment has a structure of camera server 100 of the first embodiment with the addition of a distance measurement unit 119. The hardware structure of camera server 300 of the second embodiment is similar to that of camera server 100 of the first embodiment except for the addition of distance measurement unit 119. Description of the hardware structure similar to that of camera server 100 of the first embodiment will not be repeated here.

As to the process carried out by marker detection unit 107 and privacy protection image processing unit 109 of camera server 300, a process is carried out similar to that carried out by marker detection unit 107 and privacy protection image processing unit 109 of the camera server of the first embodiment with the exception of the protection region extraction process carried out at step S04 of FIG. 4. Therefore, description of the similar process carried out will not be repeated.

Distance measurement unit 119 is an ultrasonic sensor including a transmission unit to transmit an ultrasonic wave, and a receiver unit receiving the ultrasonic wave reflected from an object. A laser sensor or a distance measurement sensor corresponding to the phase difference technique employing an image detecting device such as a CCD can be used instead of the ultrasonic sensor. Distance measurement unit 119 is placed in the proximity of camera unit 103. The distance measured by distance measurement unit 119 is the distance between camera unit 103 and the object. The focusing information of camera unit 103 can be used to measure the distance up to the object instead of using distance measurement unit 119.

Figure 11:
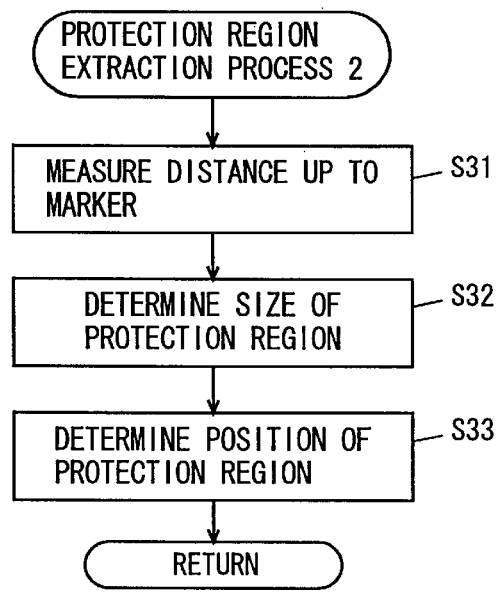
FIG. 11 is a flow chart showing a flow of an extraction process of a protection region carried out by a privacy protection image processing unit of the camera server of the second embodiment.

FIG. 11 is a flow chart of the protection region extraction process carried out by privacy protection image processing unit 109 of camera server 300 of the second embodiment. Referring to FIG. 11, the protection region extraction process includes a step (S31) of measuring the distance up to the marker, a step (S32) determining the size of the protection region, and a step (S33) determining the position of the protection region.

At step S31, the distance up to the marker corresponding to the marker region detected at step S02 of FIG. 4 is measured by distance measurement unit 119. In the case where there are a plurality of marker regions detected at step S02 of FIG. 4, the distance from camera unit 103 is measured for each of the markers corresponding to the plurality of detected marker regions at step S31.

At step S32, the size of the protection region is determined. Here, the protection region implies the region including the object of interest for privacy protection. When the distance between the object and camera unit 103 is small, the area of the object occupying the image shot by camera unit 103 is great. In contrast, when the distance between the object and camera unit 103 is great, the area of the object occupying the image shot by camera unit 103 is small. Taking advantage of the relationship between the distance of the object from camera unit 103 and the area of the object occupying the image shot by camera unit 103, the size of the protection region is determined according to the distance between camera unit 103 and the marker. Since a marker is attached to a person that becomes the object of shooting, a process is carried out with the distance between the object and camera unit 103 regarded as the distance between the marker and camera unit 103.

Figure 12:
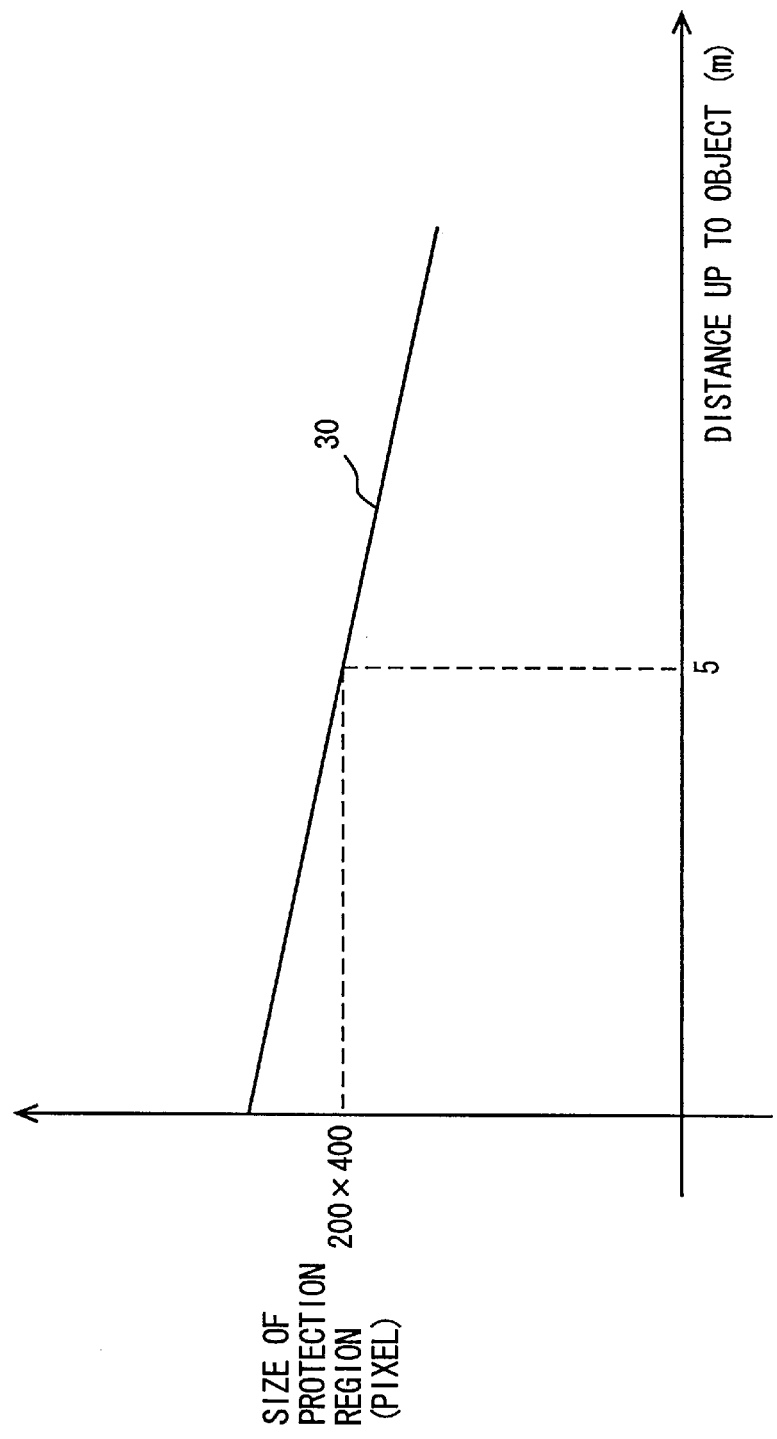
FIG. 12 is a diagram showing the relationship between the distance to an object and the size of a protection region.

FIG. 12 is a diagram to describe the relationship between the distance up to the object and the size of the protection region. Referring to FIG. 12, the distance up to the object is plotted along the abscissa, and the size of the protection region is plotted along the ordinate. The size of the protection region is represented by the number of pixels included in the protection region. A straight line 30 shows an example of the relationship between the distance up to the object and the size of the protection region. When the distance up to the object is 5 [m], the protection region has a size of 200×400 [pixels].

Straight line 30 is determined depending upon the performance and amount of zoom of camera unit 103, the size of the object, and the like. The area of the object occupying the shooting range of camera unit 103 can be derived from the performance and amount of zooming of camera unit 103. For example, when the object is a person, the size thereof can be identified to be within a certain range from the relationship between the height and width of the person. The area of the object occupying the image shot by camera unit 103 can be roughly determined according to this identified size range. Accordingly, a straight line 30 representing the relationship between the distance up to the object and the size of the protection region is determined. In the present embodiment, the aspect ratio of the protection region is set to width : height=1:2. However, the ratio is not limited to these values. When an image is picked up at a dose range by zooming in, the ratio of the object occupying the image is greater than the case where an image is picked up at a far distance and in zooming out. In this case, the amount of information of the object can be reduced by roughening the mosaic process or the like.

In the case where a plurality of marker regions are detected in the image, the size of the protection region corresponding to each marker region is determined.

Returning to FIG. 11 again, the protection region will be determined at the next step S33. At step S32, the size of the protection region has been determined. At step S33, the protection region is determined by defining where the protection region is located in the image.

The position of the marker region in the image is identified at the time point of detecting the marker region. The position of the protection region is determined so that the center of gravity of the protection region corresponds to the position of the marker region. By the alignment of the center of gravity of the protection region with the marker region position, the object with the marker will be included in the protection region.

Figure 13:
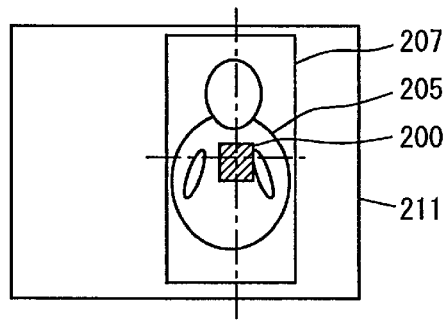
FIG. 13 shows a protection region in an image.

FIG. 13 shows a protection region 207 in an image 211. Referring to FIG. 13, protection region 207 is located within image 211 where the position of marker 200 overlaps the center of gravity of protection region 207. By representing protection region 207 with a size including object 205 and at a position where its center of gravity corresponds to marker 200, object 205 wearing marker 200 will be included in protection region 207.

Figure 14:
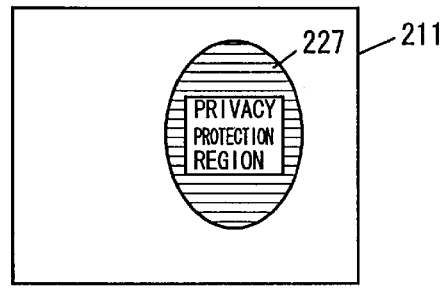
FIG. 14 shows an image output from the camera server of the second embodiment.

FIG. 14 shows an image output from camera server 300 of the second embodiment. Referring to FIG. 14, a protection region 277 of an ellipse is displayed in image 211. A mosaic process is applied on protection region 277. The text of "privacy protection region" is displayed in protection region 277.

Protection region 227 is an ellipse included in the rectangular protection region determined by the protection region extraction process described previously. By setting a protection region of a configuration analogous to the configuration of the object, the area of the protection region will become smaller. As a result, the area of the region excluding protection region 227 in image 211 will become greater, so that the amount of information that can be presented to the person viewing image 211 is increased.

By displaying the text of "privacy protection region" in protection region 227, the viewer of image 211 can recognize that protection region 227 is provided as a region disabling identification of the person according to the intention of the person requesting privacy protection.

According to camera server 300 of the second embodiment, an image conversion process such as a mosaic process is applied on the protection region including an object wearing the marker in the image. Therefore, an object 205 in protection region 207 of image 211 is output in an image where it is not possible to identify who the person is. Accordingly, camera server 300 outputs an image matching the intention of the shooter party that operates camera unit 103 while providing an image protecting the privacy of object 205 wearing marker 200.

Since an image conversion process such as a mosaic process is not applied on the region of image 211 other than protection region 207 including object 205, the amount of information applied to the viewer of image 211 can be increased.

In the case where a plurality of markers are detected in the image, a plurality of protection regions are determined and an image conversion process such as a mosaic process is applied on the plurality of protection regions. Accordingly, an image conversion process is carried out for each protection region including respective objects when there are a plurality of objects requesting privacy protection. An image protecting the privacy of each object can be output.

Since the protection region is determined according to the position of the marker region and the distance up to each corresponding marker, the object can be included easily and reliably within the protection region. As a result, an image that reliably protects the privacy of the object wearing the marker can be provided.

Third Embodiment

Figure 15:
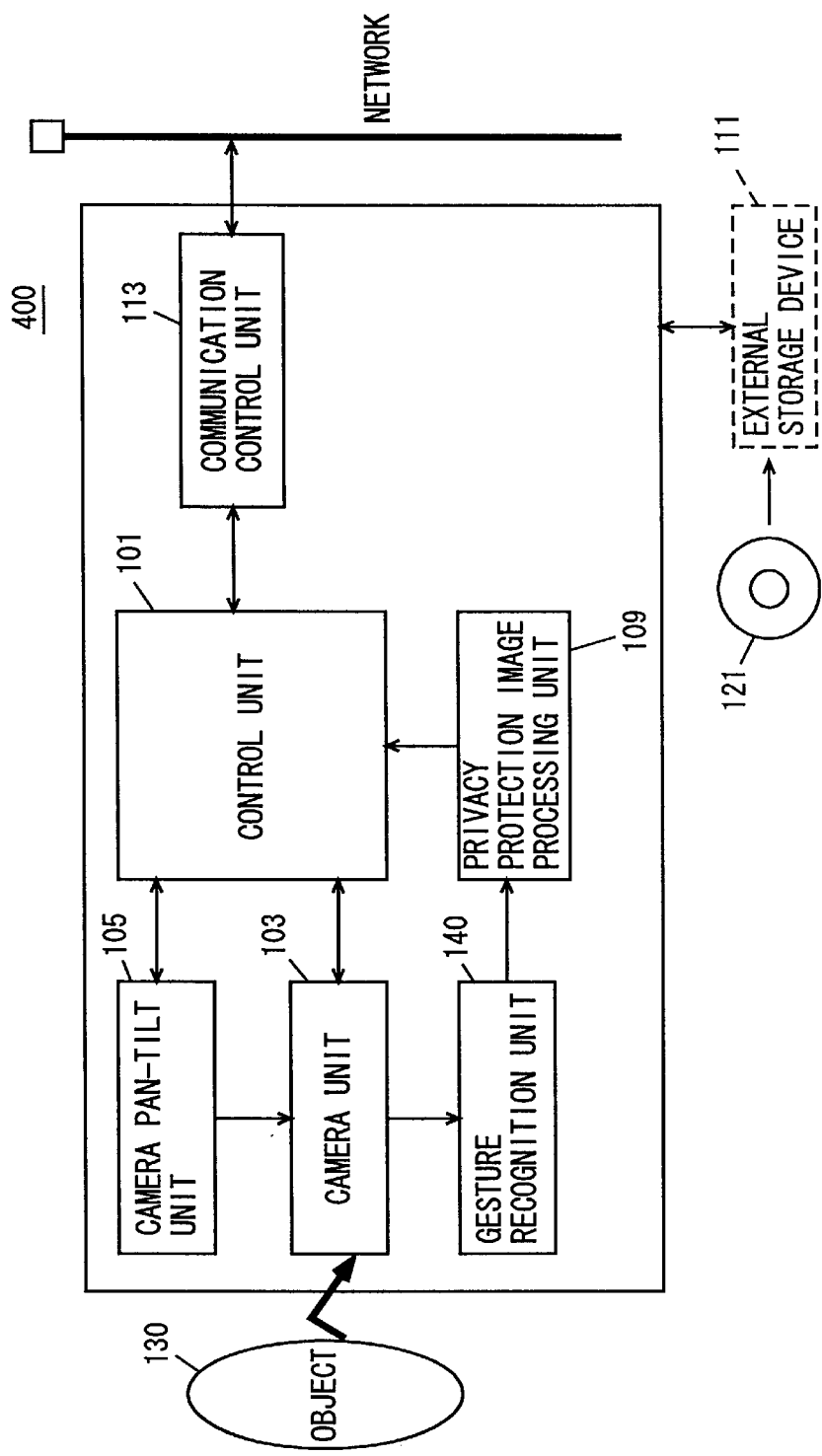
FIG. 15 is a block diagram showing a specific structure of a camera server according to a third embodiment of the present invention.

A camera server applied with an image input apparatus with an image processing function according to a third embodiment of the present invention will be described hereinafter. FIG. 15 is a block diagram showing a schematic structure of a camera server 400 of the third embodiment. Camera server 400 of the third embodiment has a hardware structure corresponding to camera server 100 of the first embodiment, provided that marker detection unit 107 of camera server 100 is substituted with a gesture recognition unit 140. Description of the hardware structure of other components is identical to that of camera server 100 of the first embodiment. Therefore, description thereof will not be repeated.

As to the process carried out by gesture recognition unit 104 and privacy protection image processing unit 109 of the third embodiment, a process similar to that carried out by marker detection unit 107 and privacy protection image processing unit 109 of camera server 100 of the first embodiment is carried out with the exception of the protection region extraction process of FIG. 5. Therefore, description of the same process will not be repeated.

FIG. 16 is a flow chart showing the protection region extraction process carried out by gesture recognition unit 140. Referring to FIG. 16, the protection region extraction process includes a step (S41) of carrying out a process of extracting an object from an image shot by camera unit 103, a step (S42) of identifying whether the extracted object is of a predetermined configuration or not (S42), and a step (S43) of determining an object region in the image as the protection region.

At step S41, an object is extracted from the image shot by camera unit 103. Similar to the marker detection carried out by marker detection unit 107 of the first embodiment, the extraction of an object is carried out using well-known technique. Here, the extracted object is a person.

At step S42, determination is made whether the extracted object is of a predetermined configuration or not. A predetermined configuration is prestored in gesture recognition unit 140. Gesture recognition unit 140 collates the image shot by camera unit 103 with the predetermined configuration to determine whether an object of a predetermined configuration is included in the image. In the case where the predetermined configuration is analogous to the configuration of the object included in the image, determination is made that the object is of the predetermined configuration. For example, when the predetermined configuration prestored in gesture recognition unit 140 is a configuration of a person crossing his/her hands, determination is made whether the configuration of the object included in the image is of a configuration with hands crossed.

When determination is made that the configuration of the object is analogous to the predetermined configuration (YES at S42), control proceeds to step S43. When the configuration of the object is not analogous to the predetermined configuration (NO at S42) the process ends without carrying out step S43.

In the case where a plurality of objects are extracted at step S41, the similarity of the predetermined configuration is determined for each of the plurality of objects extracted at step S42. In the case where a plurality of predetermined configurations are prestored, determination is made of the similarity of the configuration of the object with each of the plurality of predetermined configurations.

At step S43, a region of an object analogous to the predetermined configuration is determined to be the protection region in the image.

FIGS. 17A and 17B show an image input to and an image output from camera server 400, respectively. Referring to FIG. 17A, an object 231 with crossed hands is included in image 211. Referring to FIG. 17B, a protection region 232 corresponding to the region of the object in image 211 is displayed as being subjected to a mosaic process.

When the object first does not want to be shot and indicates the gesture of crossing his/her hands and then decides to permit shooting, the object can indicate a predetermined gesture to render the protection region in the image to an image not subjected to the mosaic process. For example, a configuration of an object delineating a circle with both hands is prestored in gesture recognition unit 140. The mosaic process will not be applied on the protection region when an object of a configuration delineating a circle with both hands is extracted from the image.

Figure 18A:
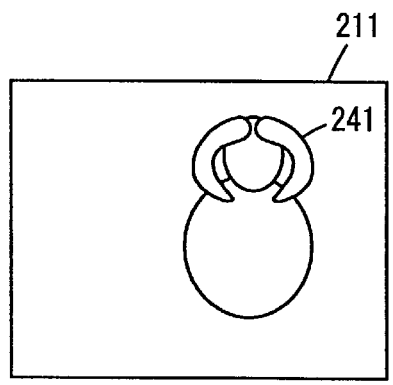
FIGS. 18A and 18B show an image input to and an image output from the camera server when the object provides the gesture of drawing a circle with both hands.
Figure 18B:
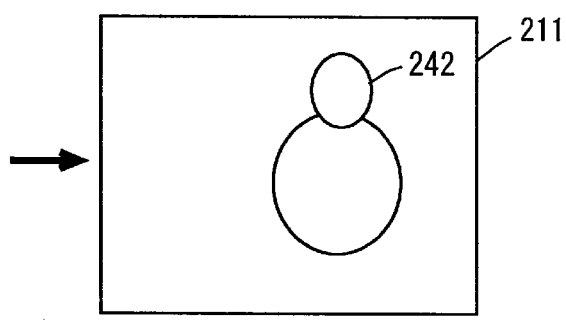

FIGS. 18A and 18B show an image input to and output from camera server 400 when an object provides the gesture of delineating a circle with both hands, respectively. Referring to FIG. 18A, an object 241 delineating a circle with both hands is included in an image 211. Referring to FIG. 18B, the mosaic process is not applied on object 242 in image 211. An image is provided in which identification of object 242 can be made.

According to the configuration of the object included in the image, determination is made whether to carry out a mosaic process on the region of the object in the image. Accordingly, the image of the object can be converted into an image that disables identification of the object according to the intention of the person who becomes the object.

According to camera server 400 of the third embodiment, an image conversion process such as a mosaic process is applied on a region of an object with a predetermined configuration in the image. An image is obtained in which a viewer cannot identify who the object carrying out a predetermined gesture is. Accordingly, camera server 400 can output an image according to the intention of the shooter that operates camera unit 103 while the privacy of the object with a predetermined gesture is protected.

Since the region in the image other than the region of the object carrying out a predetermined gesture is not subjected to an image conversion process such as a mosaic process, a greater amount of information can be applied to the viewer of the image.

Fourth Embodiment

Figure 19:
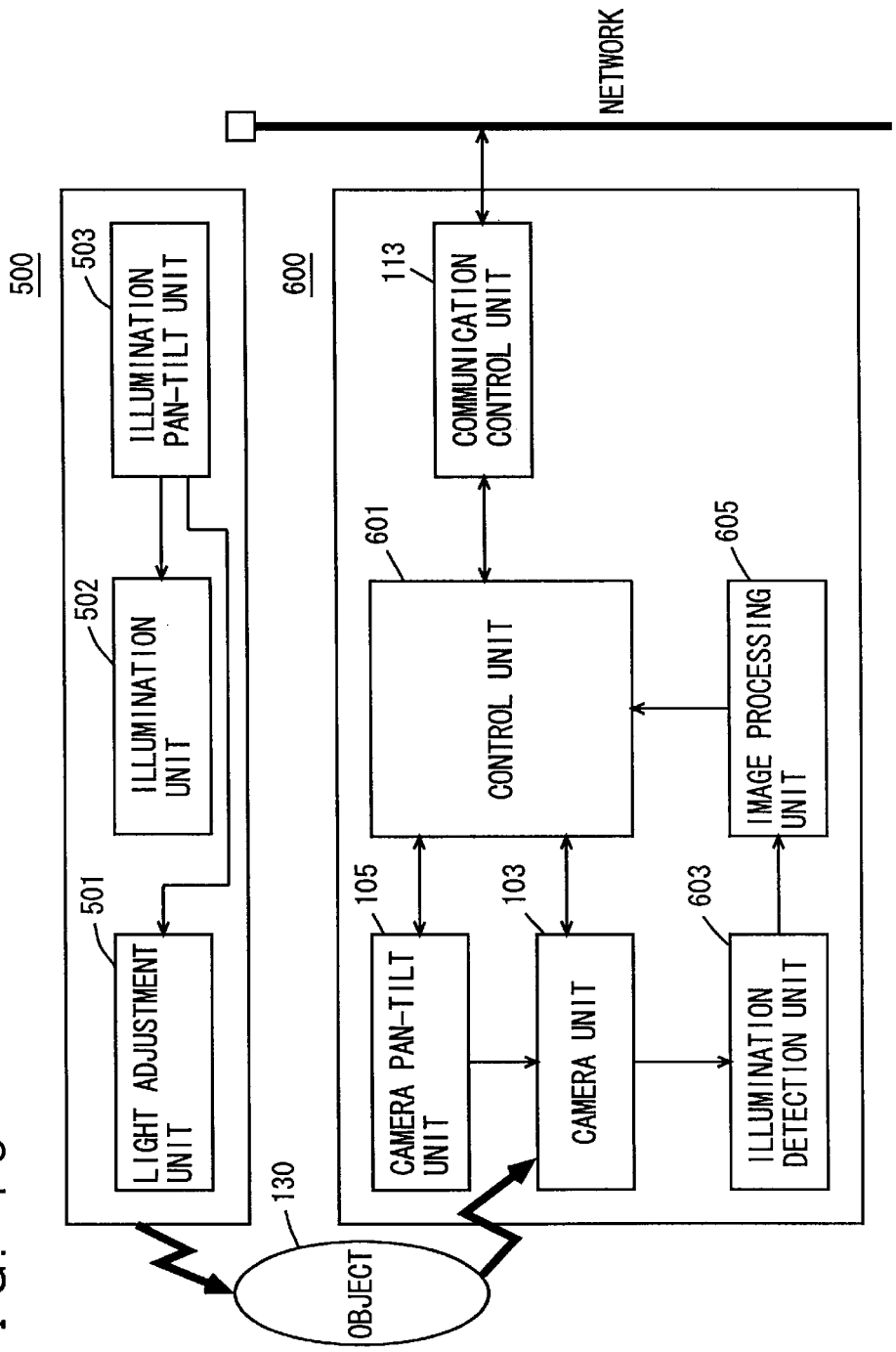
FIG. 19 is a block diagram showing a schematic structure of an image processing system according to a fourth embodiment of the present invention.

FIG. 19 is a block diagram schematically showing an image processing system according to a fourth embodiment of the present invention. The image processing system of the fourth embodiment includes mainly an illumination device 500 and camera server 600.

Illumination device 500 includes an illumination unit 502 to illuminate an object, a light adjustment unit 501 to adjust the illumination range of illumination unit 502, and an illumination pan-tilt unit 503 to shift the illumination range of illumination unit 502 vertically and horizontally.

Illumination unit 502 is a lamp that emits visible light or infrared light, or a lamp emitting light including visible light and infrared light. Light adjustment unit 501 is a reflective plate covering the side face of illumination unit 502. By altering the shape of light adjustment unit 501, the angle of spreading light emitted from illumination unit 502 can be changed. By adjusting the angle of light extension emitted from illumination unit 502 through light adjustment unit 501, the range illuminated by illumination unit 502 can be altered.

Figure 20B:
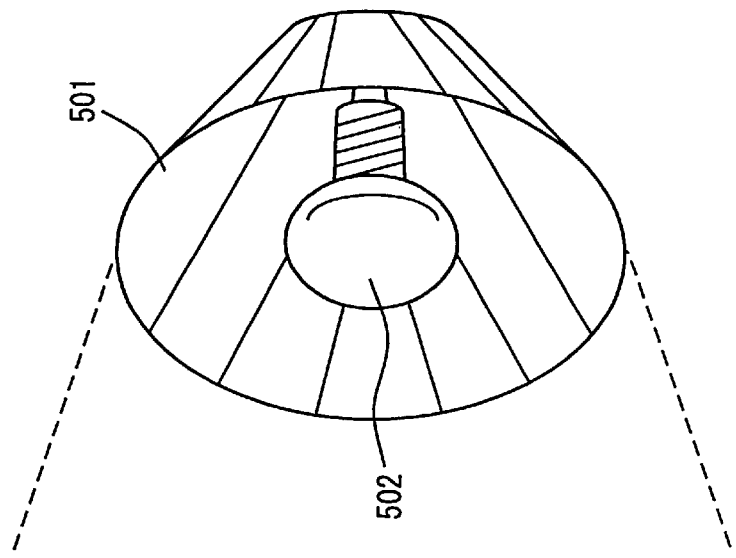
FIGS. 20A and 20B show an example of altering the illumination angle by modifying a light adjustment unit.
Figure 20A:
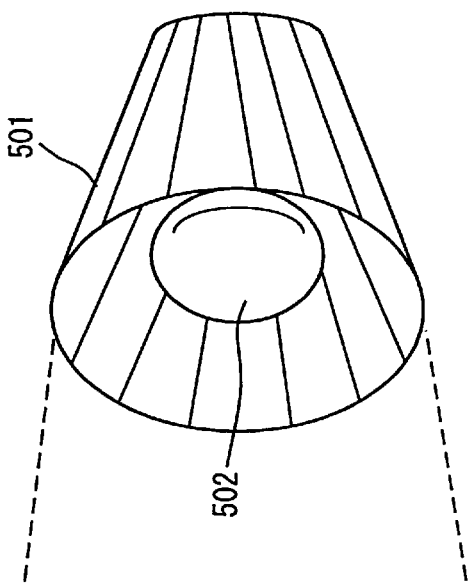

FIGS. 20A and 20B show examples of altering the illumination angle by modifying light adjustment unit 501. FIGS. 20A and 20B correspond to light adjustment unit 101 when the illumination angle is reduced and increased, respectively. It is appreciated from FIGS. 20A and 20B that the spread of light adjustment unit 501 becomes smaller when the illumination angle is reduced than in the case where the illumination angle is great. By modifying the shape of light adjustment unit 501, the spreading angle of light emitted from illumination unit 502 can be adjusted.

Illumination pan-tilt unit 503 operates to shift illumination unit 502 and light adjustment unit 501 vertically and horizontally. The operation of swinging up and down is called a tilt movement, and the operation of swinging leftwards and rightwards is called a pan movement. By effecting the pan and tilt motion by illumination pan-tilt unit 503, the range illuminated by illumination unit 502 can be shifted vertically and horizontally.

The power of illumination unit 502 of illumination device 500 is turned on/off in response to the power of the illumination of the room in which illumination unit 500 is installed. According to a control signal from camera server 600 that will be described afterwards, control is provided so that the power of illumination unit 102 is turned on only when camera unit 103 carries out shooting.

Referring to FIG. 19 again, camera server 600 includes a camera unit 103 to shoot an object 110, a camera pan-tilt unit 105 to shift the shooting direction of camera unit 103 vertically and horizontally, an illumination detection unit 603 to detect an object illuminated with illumination unit 502 from the image shot by camera unit 103, an image processing unit 605 to apply a predetermined image process on the object detected by illumination detection unit 603, a communication control unit 113 to carry out communication with another computer or the like connected to the network, and a control unit 601.

Illumination detection unit 603 receives image data from camera unit 103. Illumination detection unit 603 detects an object illuminated by illumination unit 502 from the image data received from camera unit 103.

Image processing unit 605 applies a predetermined image process on the image data of the object detected by illumination detection unit 603. The image data subjected to image processing is transmitted to control unit 605.

Control unit 601 transmits the processed image data received from image processing unit 605 to a computer or the like connected to the network via communication control unit 113. The computer or the like connected to the network can display image data subjected to image processing at image processing unit 605.

Figure 21:
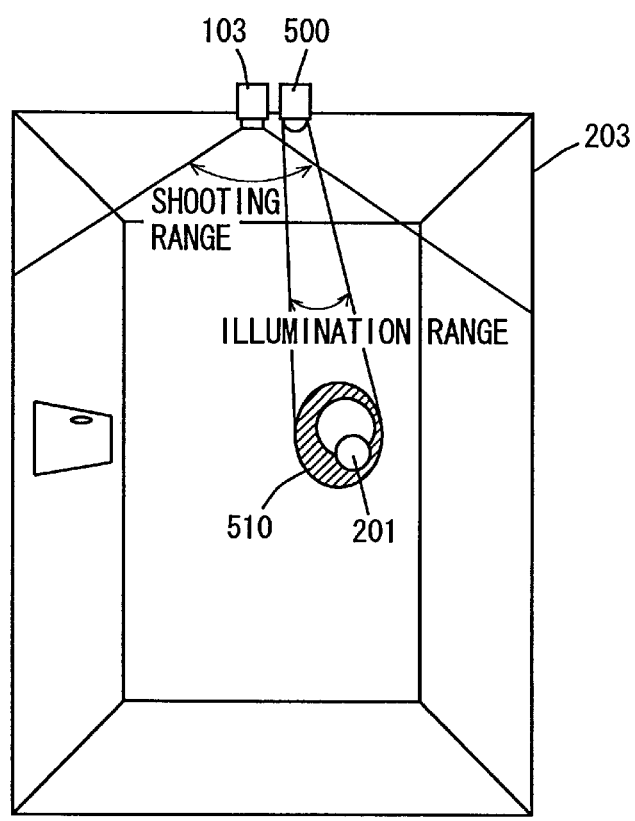
FIG. 21 is a diagram showing an example of an illumination device and a camera unit installed in a room when viewed from above the room.

FIG. 21 shows the case where illumination device 500 and camera unit 103 are placed in a room. FIG. 21 corresponds to a view from above the room. There is an object 201 in the room. An illumination region 510 illuminated by illumination device 500 is a region of object 201 including the neighborhood. The shooting range that can be shot by camera unit 103 corresponds to a wide range including illumination region 510.

FIGS. 22A and 22B are diagrams to describe the range illuminated by illumination device 500. FIG. 22A corresponds to the case where the illumination angle is reduced to decrease illumination region 510. There are objects 201 and 202 in a room 203. By reducing the illumination angle of illumination device 500, illumination range 510 is reduced so that only object 201 is included in illumination region 510. FIG. 22B corresponds to the case where the illumination angle is increased to obtain a larger illumination region 510. By increasing the illumination angle of illumination device 500, objects 201 and 202 are both included in illumination region 510.

By altering the illumination angle of illumination device 500, only a desired object can be included in illumination region 510 out of the objects in the shooting range of camera unit 103. Since illumination region 510 can be moved according to the pan motion and tilt motion of illumination device 500, an object can be included in illumination region 510 of illumination device 500 no matter where the object is in the shooting range. In the case where a plurality of objects are included in the range that can be shot by camera unit 103, a plurality of objects can be included in illumination region 510 by widening the illumination angle of illumination device 500.

Figure 23A:
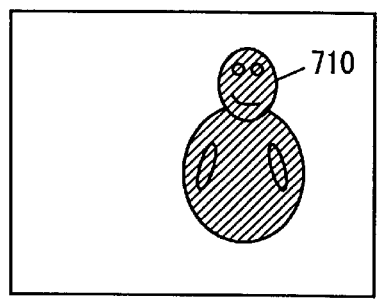
FIGS. 23A and 23B are diagrams showing an image input to and an image output from the camera server.
Figure 23B:
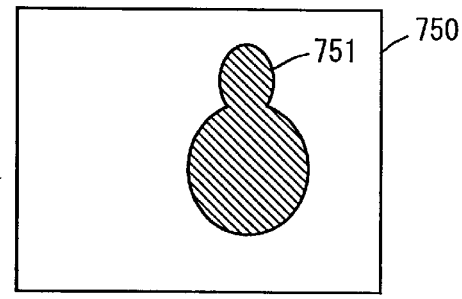

FIGS. 23A and 23B show an image input to and output from camera server 600. FIG. 23A shows an image input to camera server 600. An object 710 illuminated by illumination device 500 is included in an image 700. Object 710 that is illuminated by illumination device 500 to have a larger luminance value of the pixel is represented in a hatched manner. Upon input of the image of FIG. 23A to camera unit 103, a region 710 of high luminance is detected by illumination detection unit 603. Then, a predetermined image process such as a mosaic process or the like is applied on region 710 that has high luminance by image processing unit 605. The image data subjected to image processing is output from camera server 600.

FIG. 23B shows an image output from camera server 600. In comparison with the image input to camera server 600 of FIG. 23A, the region of object 710 in image 700 is converted into a region 751 subjected to the image process of a mosaic process or the like in image 750. Region 751 subjected to the image process corresponds to an image by which a viewer cannot identify who the object is.

The process carried out by the image processing system of the present embodiment will be described with reference to the flow chart of FIG. 24. The process carried out by the image processing system of the present embodiment includes a step (S101) of specifying an illuminating range of illumination device 500, a step (S102) determining the shooting range by camera pan-tilt unit 105 and camera unit 103 to input an image shot by camera unit 103, a step (S103) detecting an object illuminated by illumination device 500 from the image data output from camera unit 103, a step (S104) carrying out an image conversion process of converting the image data of the object detected at step S103, and a step (S105) of providing image data subjected to the image conversion process at step S104.

Figure 24:
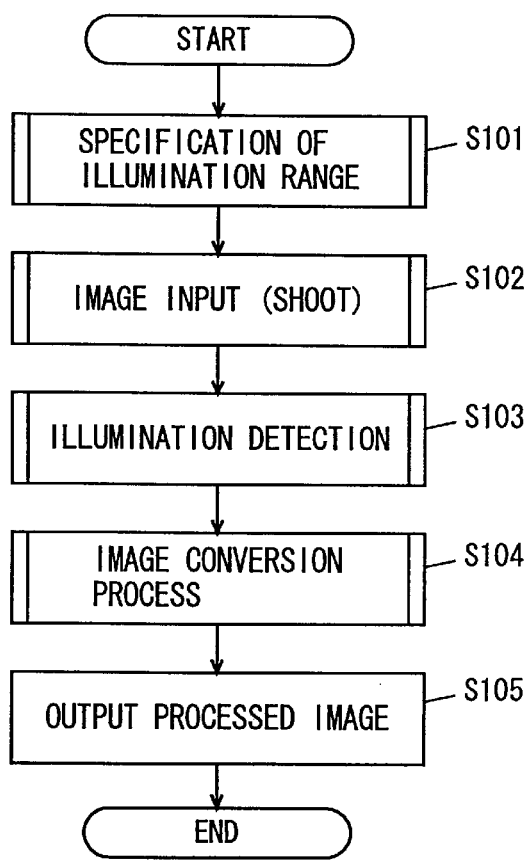
FIG. 24 is a flow chart showing a flow of a process carried out by the image processing system of the fourth embodiment.
Figure 25:
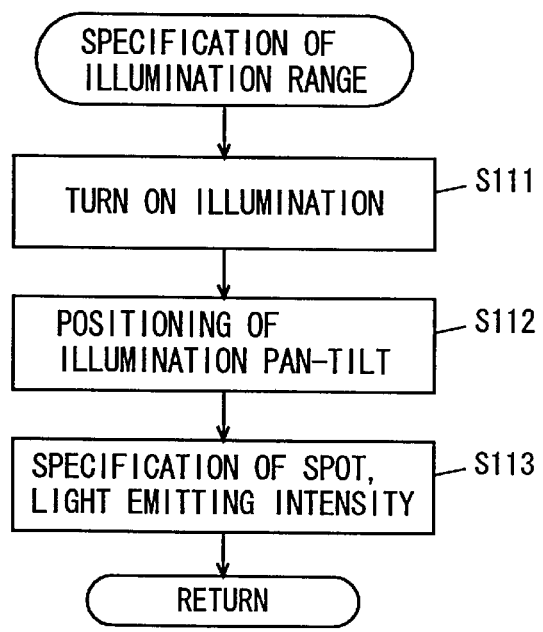
FIG. 25 is a flow chart showing a flow of a illumination range setting process carried out at step S101 of FIG. 24.

FIG. 25 is a flow chart showing an illumination range specify process carried out at step S101 of FIG. 24. Referring to FIG. 25, the illumination range specify process includes a step (S111) of turning on the illumination, a step (S112) of determining the pan position and the tilt position in the pan and tilt motion carried out by illumination pan-tilt unit 503, and a step (S113) of specifying the spot of light adjustment unit 501 and the light emitting intensity of illumination unit 502.

At step S111, the power of the light of the room is turned on to cause the power of illumination unit 102 to be turned on. Accordingly, light of a predetermined wavelength is emitted from illumination unit 102.

At step S112, the pan position and tilt position required in the pan and tilt motion carried out by illumination pan-tilt unit 503 is determined. Determination of the pan position and tilt position is carried out by an operation unit to operate an illumination device 500 not shown. Operation of the operation unit is effected by an object 130. This operation is allowed through a remote controller carried by object 130. Object 130 can control illumination pan-tilt unit 503 to include himself/herself in the illumination region formed by illumination unit 502 emitting light.

At step S113, the spot of light adjustment unit 501 and the light emitting intensity of illumination unit 502 are specified. Spot specification of light adjustment unit 501 is carried out by altering the configuration of light adjustment unit 501. The spot specification of light adjustment unit 501 and the light emitting intensity specification of illumination unit 502 are carried out by object 130 operating the operation unit of illumination device 500. Accordingly, object 130 can arbitrarily set the size of the illumination region corresponding to the illumination by illumination unit 502, and also adjust the light emitting intensity of illumination unit 502 corresponding to the brightness of the surrounding.

Figure 26:
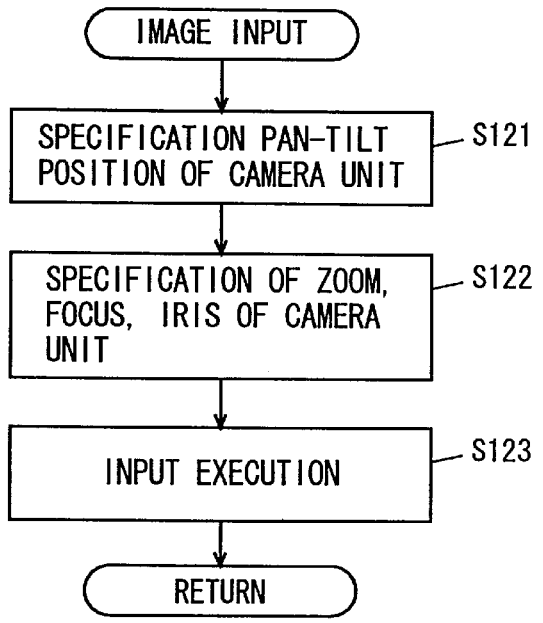
FIG. 26 is a flow chart showing a flow of an image input process carried out at step S102 of FIG. 24.

FIG. 26 is a flow chart showing an image input process carried out at step S102 of FIG. 24. Referring to FIG. 26, the image input process includes a step (S121) setting the pan and tilt position of camera unit 103, a step (S122) specifying the zoom, focus, and iris of camera unit 103, and a step (S123) entering image data by shooting with camera unit 103.

At step S121, the pan position (position in the horizontal direction) and the tilt position (the position in the vertical direction) are specified to determine the direction of shooting by camera unit 103 with respect to camera pan-tilt unit 105. Specification of the pan position and tilt position is effected by transmitting a control command from control unit 601 to camera pan-tilt unit 105. Control unit 601 receives a command to shift the shooting direction of camera unit 202 from another personal computer or the like connected to the network via communication control unit 113. Control unit 601 transmits a control command indicating the pan position and tilt position according to the received command to camera pan-tilt unit 105. Accordingly, camera pan-tilt unit 105 shifts the shooting direction of camera unit 103 to the pan position and tilt position corresponding to the received control command.

At step S122, specification of the zoom, focus, iris of camera unit 103 is carried out. Control unit 601 transmits a control command to camera unit 103 according to the received command from a computer or the like connected to the network via communication control unit 113. Information of the zoom, focus and iris to be specified to camera unit 103 is included in the control command. At camera unit 103, the zoom, focus and iris are specified according to the received control command.

By step S121, the shooting position of camera unit 103 is shifted vertically and horizontally, whereby the orientation of camera unit 103 is determined. At step S122, the size of the shooting range, the focus of distance, and the brightness of the input image are determined by the specification of the zoom, focus and iris of camera unit 103.

At step S123, the image shot by camera unit 103 is converted into electric signals, and image data is output to illumination detection unit 603.

The image data output from camera unit 103 may be data of a still image or a motion picture. In the case of a motion picture, the process described hereinafter is carried out for each frame. Alternatively, a predetermined frame can be selected to which the following process is to be carried out exclusively on that frame.

The output timing of the image data from camera unit 103 is controlled by control unit 601. Camera unit 103 outputs image data in response to a command from control unit 601.

Figure 27:
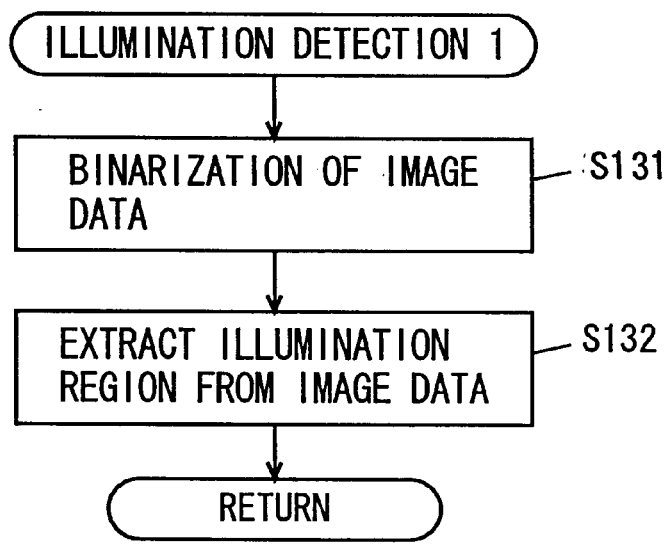
FIG. 27 is a flow chart showing a flow of an illumination detecting process carried out at step S103 of FIG. 24.

FIG. 27 is a flow chart showing an illumination detection process carried out at step S103 of FIG. 24. Referring to FIG. 27, the illumination detection process includes a step (S131) of binarizing the input image data, and a step (S132) of extracting an illumination region from the image data.

The illumination detection process is carried out by illumination detection unit 603. At step S131, luminance information is extracted from the image data output from camera unit 103. The extracted luminance information is binarized using a predetermined threshold value. In the present embodiment, binarization is carried out using luminance information. However, binarization can be carried out using hue or the like.

At step S132, a pixel having a luminance higher than the predetermined threshold value is extracted from the binarized image data. The group of the extracted pixels corresponds to the region illuminated by illumination unit 502. Thus, a region illuminated by illumination unit 502 is extracted from the image data.

Figure 28B:
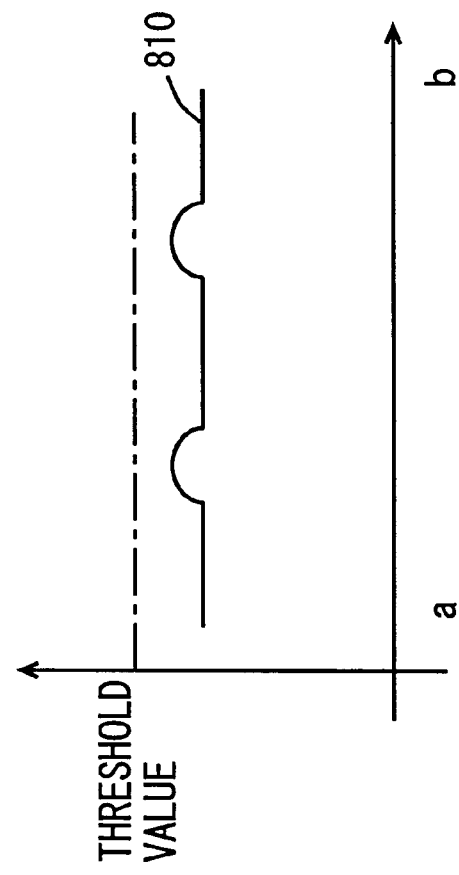
FIGS. 28A and 28B show image data and luminance data obtained when not illuminated by the illumination device.
Figure 28A:
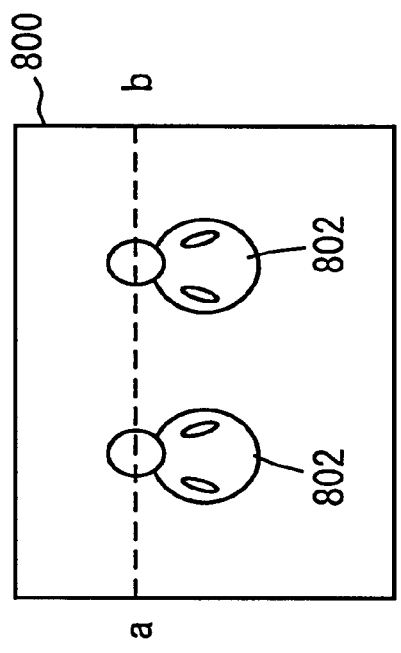

This illumination detection process will be described more specifically hereinafter. FIG. 28A shows image data obtained when not illuminated by illumination device 500. Referring to FIG. 28A, image data 800 includes the data of objects 801 and 802. Objects 801 and 802 are both not illuminated by illumination device 500. FIG. 28B shows luminance data at a horizontal line a-b in image data 800 of FIG. 28A. Luminance data 810 exhibits a high value at the area of objects 801 and 802, but than the threshold value. This is because objects 801 and 802 are both not illuminated by illumination device 500.

Figure 29B:
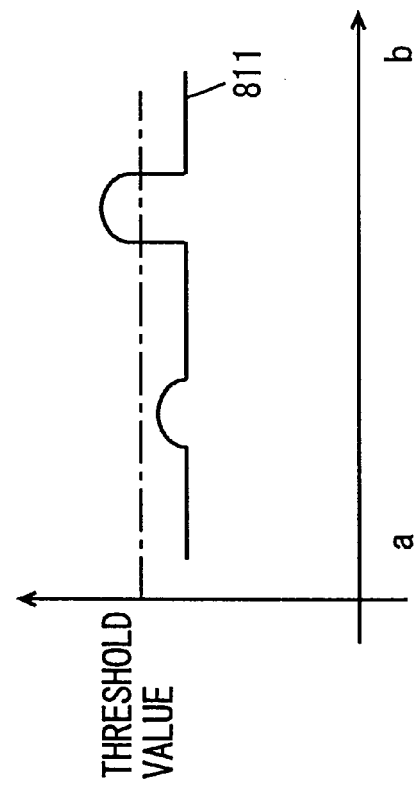
FIGS. 29A and 29B show image data and luminance data obtained when illuminated by the illumination device.
Figure 29A:
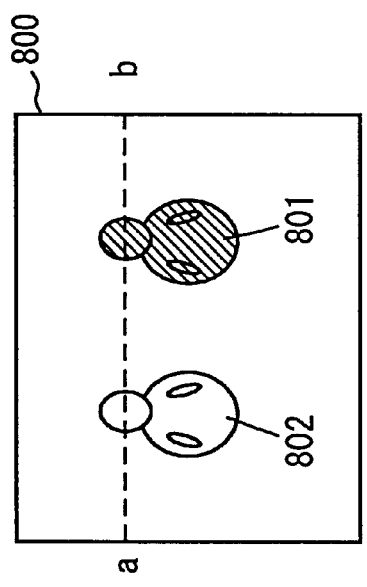

FIG. 29A shows image data obtained when illuminated by illumination device 500. Image data 800 includes data of an object 801 illuminated by illumination device 500 and an object 802 that is not illuminated. FIG. 29B shows luminance data at a horizontal line a-b in image data 800 of FIG. 29A. In the area of object 801, luminance data 811 exhibits a luminance value higher than the threshold value. In contrast, in the area of object 802, luminance data 811 exhibits a high, but lower value than the threshold value.

When luminance data 810 of FIG. 28B is binarized according to the threshold value, all the pixels will have the value of "0". When luminance data 811 of FIG. 29B is binarized according to the threshold value, the region of object 801 provides "1" whereas the remaining portion provides "0". Accordingly, a region illuminated by illumination device 500 at a horizontal line a-b of image data 800 is extracted. By shifting horizontal line a-b from the top to bottom of image data 800 and carrying out the above-described binarization process, the area of object 801 in image data 800 can be extracted as the region illuminated by the illumination device.

Figure 30:
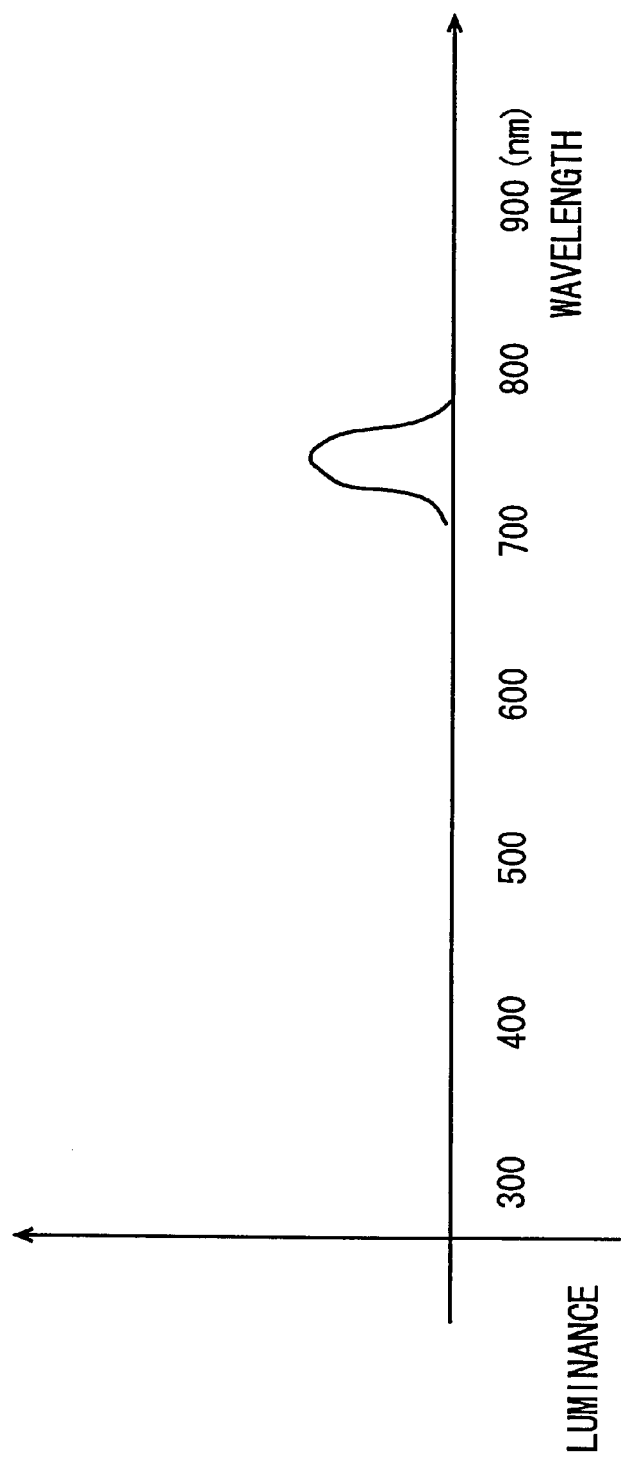
FIG. 30 shows the wavelength when the light illuminated from the illumination unit is infrared light.

The light emitted from illumination unit 502 of illumination device 500 may be infrared light. FIG. 30 represents the wavelength when the light emitted from illumination unit 502 is infrared light. The wavelength of the light emitted from illumination unit 102 is within the range of 700 [nm] to 800 [nm].

Figure 31:
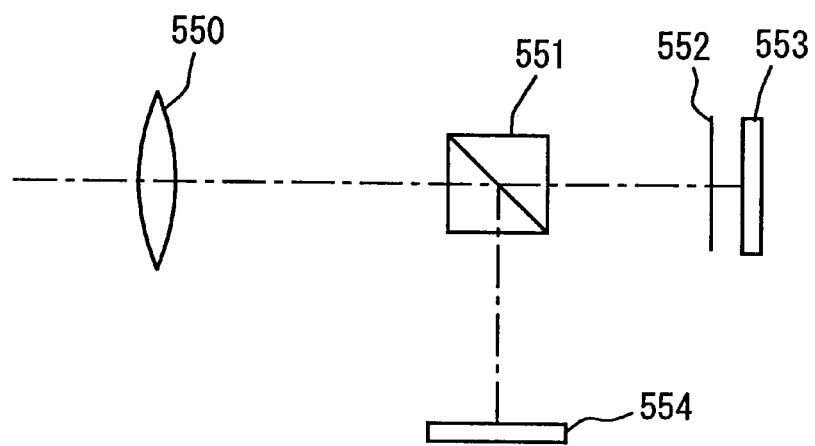
FIG. 31 shows a schematic structure of a camera unit when the light illuminated from the illumination unit is infrared light.

FIG. 31 shows a schematic structure of camera unit 103 when the light emitted from illumination unit 502 is infrared light. Referring to FIG. 31, camera unit 103 includes a lens 550, a beam splitter 551, a CCD 554 for visible light, a filter 552 for selecting and transmitting infrared light, and a CCD 553 to receive infrared light. The incident light through lens 550 is divided into two paths by beam splitter 551. The first path is towards CCD 554 receiving visible light and the second path is towards CCD 553 receiving infrared light. Visible light receiving CCD 554 receives the light of all wavelength transmitted through lens 550. Filter 552 transmits the having a wavelength in the range from 700 [nm] to 800 [nm] out of the light transmitted through lens 550. Infrared light receiving CCD 553 receives light that has passed through filter 552.

The infrared light emitted from illumination device 500 is directed on the object and reflected. The reflected infrared light is received at infrared light receiving CCD 553. By carrying out the above-described illumination detection process on the image data output from infrared light receiving CCD 553, a region irradiated with infrared light is extracted from the image data. The image data output from visible light receiving CCD 554 is image data of a region identical to that of the image data output from infrared light receiving CCD 553. The image data output from visible light receiving CCD 554 is not used in the illumination detection process. Data of the region irradiated with infrared light and detected according to the image data output from infrared light receiving CCD 553 is transmitted to image processing unit 605 in correspondence with the image data output from visible light receiving CCD 554.

In the case where the light emitted from illumination unit 502 is infrared light, object 130 cannot recognize by sight the region illuminated by illumination unit 502 (illumination region). It is therefore desirable that the light emitted from illumination unit 502 is not infrared light alone, but light also including visible light. In the case where the light emitted from illumination unit 502 is infrared light alone, it is preferable to provide another illumination device directing visible light to the region illuminated by illumination unit 502. This allows object 130 to confirm by sight the illumination region illuminated by illumination unit 502.

Object 130 can operate the operation unit of illumination device 500 to turn off the power of the other illumination unit emitting visible light when the position of the illumination region is determined. Accordingly, object 130 will not be disturbed by the illumination since the infrared light emitted from illumination unit 502 cannot be recognized.

Figure 32:
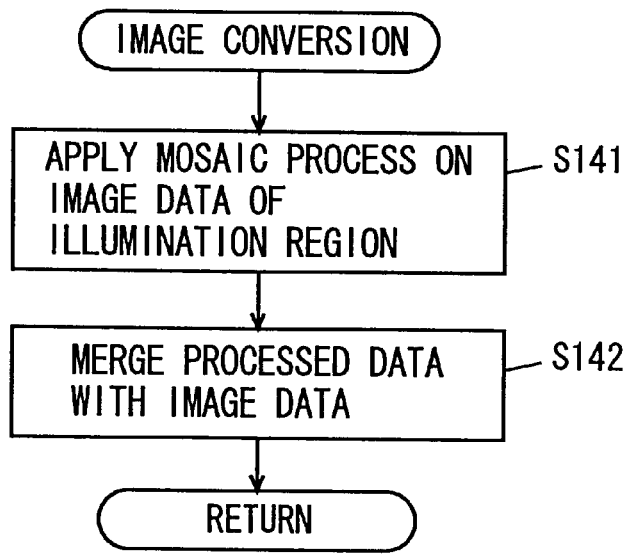
FIG. 32 is a flow chart showing a flow of an image conversion process carried out at step S104 of FIG. 24.

FIG. 32 is a flow chart showing an image conversion process carried out at step S104 of FIG. 24. The image conversion process is carried out at image processing unit 605. The image conversion process includes a step (S141) applying a mosaic process on the image data of the region illuminated by illumination device 500 in the image data, and a step (S142) merging the image data and the image data subjected to a process at step S141.

At step S141, a mosaic process is carried out on all the image data included in the region illuminated by illumination device 500 and extracted by the illumination detection process of FIG. 27. Accordingly, the region illuminated by illumination device 500 is converted into image data that cannot be recognized by a person when output on a display or the like. A filter process such as a LUT (look up table) conversion can be used instead of the mosaic process. Furthermore, another image data can be prestored so that image data of the region illuminated by the illumination device is substituted with the prestored another image data.

At step S142, image data of an illumination region that is subjected to a mosaic process to disable recognition by a person is merged with the original image data. Accordingly, image data of the region illuminated by illumination device 100 out of the image data corresponds to image data subjected to a mosaic process. Image data of the region other than that of the region illuminated by illumination device 100 corresponds to the former image data. Therefore, a person can identify that area when displayed on a display.

Figure 33A:
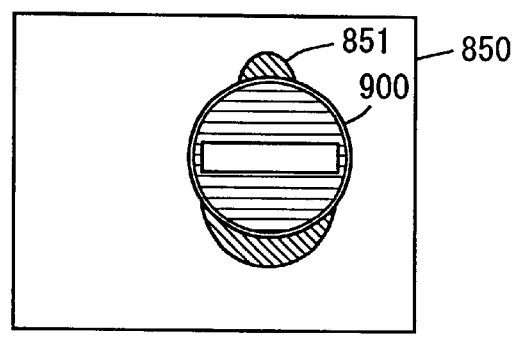
FIGS. 33A, 33B and 33C show specific examples of image data output from the image processing unit.
Figure 33B:
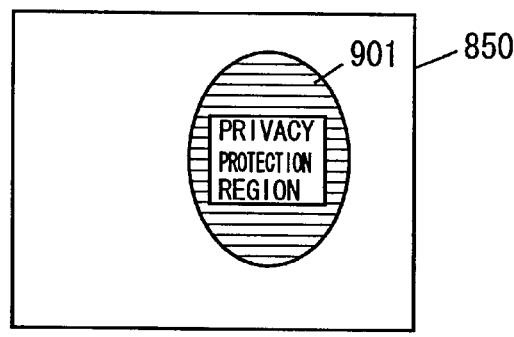
Figure 33C:
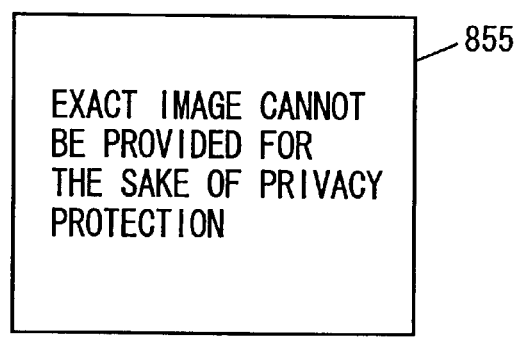

FIGS. 33A, 33B and 33C show specific examples of image data output from image processing unit 204. FIG. 33A shows a region 851 illuminated with illumination device 500 and subjected to a mosaic process in image data 850, and a label 900 providing the indication of a protection region overlaid on region 851. By providing a display on which a label 900 is overlaid on a region 851 illuminated by illumination device 500, the viewer of image data 850 at a display can recognize that the person in region 851 is seeking privacy protection.

FIG. 33B shows an ellipse region 901 in image data 850. The text of "Privacy Protection Region" is displayed in region 901. The configuration of region 901 is not limited to an ellipse, and may be a rectangle or circle. By displaying the text of "Privacy Protection Region" in region 901, the viewer of image data 850 can recognize that region 901 is rendered view-blocked respecting the person's intention of seeking privacy protection.

FIG. 33C shows the case where a mosaic process is applied entirely on image data 855 and the text of "For the sake of privacy protection, the exact image cannot be provided" is overlaid on the image data. In this manner, a mosaic process can be applied entirely on image data 855.

Modification of Illumination Detection Process

Figure 34:
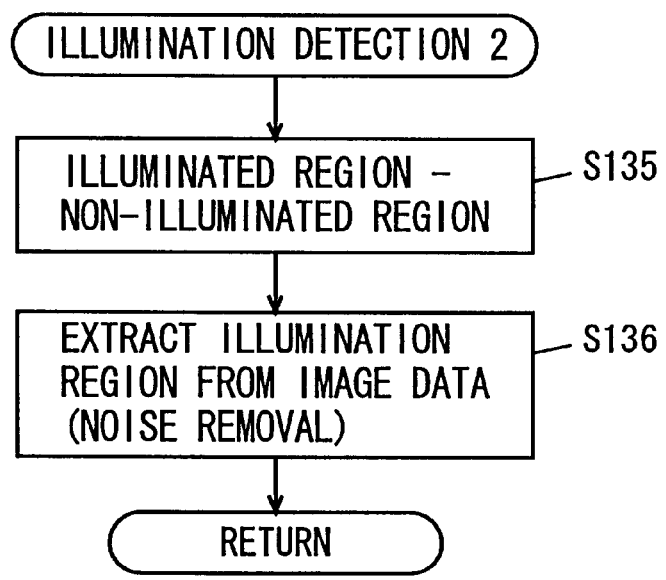
FIG. 34 is a flow chart showing a flow of a modified illumination detection process carried out at step S103 of FIG. 24.

Modification of the illumination detection process will be described with reference to the flow chart of FIG. 34. FIG. 34 corresponds to a modification of the illumination detection process carried out at step S103 of FIG. 24. Referring to FIG. 34, the modified illumination detection process includes a step (S135) obtaining the differential image data between image data obtained when illuminated by illumination device 500 (illumination projected image) and image data obtained when not illuminated (illumination not-projected image), and a step (S136) extracting the region illuminated by illumination device 500 from the obtained differential image data.

At step S135, the difference between the luminance data obtained from the image data output from camera unit 103 when illuminated by illumination device 500 and the luminance data obtained from the image data output from camera unit 103 when not illuminated by illumination device 500 is obtained. At step S136, the region including pixels of the difference obtained at step S135 greater than the predetermined value is extracted as the illumination region.

Image data output from camera unit 103 when illuminated by illumination device 500 and image data output from camera unit 103 when not illuminated by illumination device 500 can be obtained as set forth in the following. The output timing of image data from camera unit 103 is control by control unit 601. Control unit 601 also controls illumination unit 502 of illumination device 500. Here, the image data output timing from camera unit 103 is set to match the timing of illuminating or not illuminating by illumination unit 502.

Figure 35A:
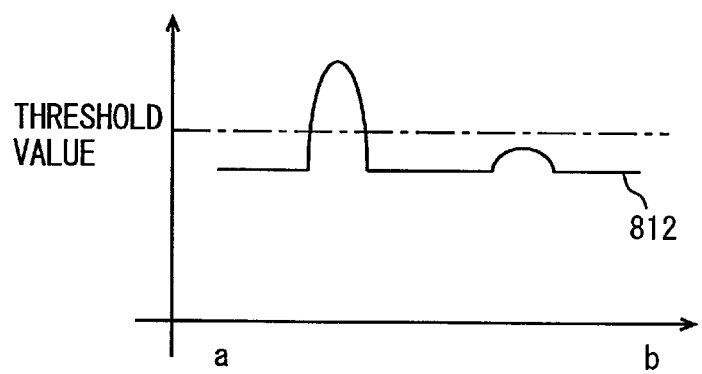
FIGS. 35A, 35B and 35C are diagrams to describe a modified illumination detection process.
Figure 35B:
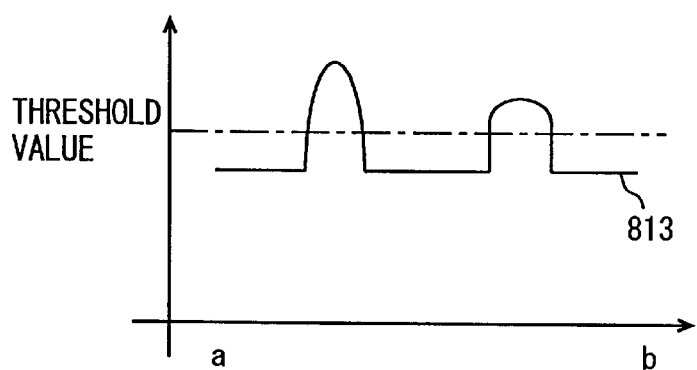
Figure 35C:
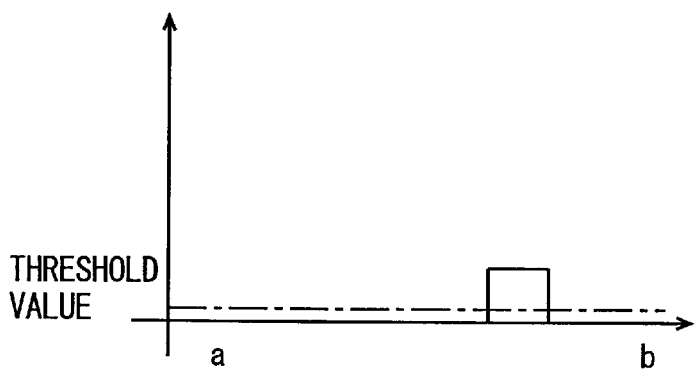

FIGS. 35A, 35B and 35C are diagrams to describe the modified illumination detection process. FIG. 35A shows luminance data obtained from the image data output from camera unit 103 when not illuminated by illumination device 500. The image data obtained when not illuminated by illumination device 500 is identical to that of FIG. 28A. Referring FIGS. 28A and 35A, luminance data 812 exhibits a value greater than the threshold value at the region of object 802. This is because object 802 happens to wear clothing of high reflectance. The luminance value of the region of object 801 is higher, but lower than the threshold value. By carrying out binarization according to the luminance data and the threshold value, object 802 will be extracted as the region illuminated by illumination device 500. The desired result cannot be obtained by this extraction.

FIG. 35B shows luminance data obtained from the image data output from camera unit 103 when illuminated by illumination device 500. The image data obtained when illuminated by illumination device 500 corresponds to the image data shown in FIG. 29A. Referring to FIGS. 29A and 35B, luminance data 813 exhibits a value greater than the threshold value at the regions of objects 802 and 801. In comparing luminance data 812 shown in FIG. 35A with luminance data 813, the luminance value of the region of object 802 is identical. However, the luminance value of the region of object 801 is greater for luminance data 813. When binarization is carried out according to luminance data 813 and the threshold value, the regions of objects 802 and 801 will be extracted as the region illuminated by illumination device 500. The desired result cannot be obtained in this case.

FIG. 35C shows the difference between luminance data 813 obtained from the image data output from camera unit 103 when illuminated by illumination unit 500 and the luminance data 812 obtained from the image data output from camera unit 103 when not illuminated. Referring to FIG. 35C, the difference value is greater than the threshold value at the region of object 801. Therefore, only object 801 will be extracted as the region illuminated by illumination device 500.

By extracting a region illuminated by illumination device 500 on the basis of image data obtained when illuminated by illumination device 500 and image data obtained when not illuminated, the region extracted by illumination device 500 can be properly extracted.

In the image processing system of the fourth embodiment, the image of the region illuminated by illumination device 500 in the image shot by camera unit 103 is subjected to a mosaic process. In the case where the person residing in the shooting range of camera unit 103 operates illumination device 500 so that he/she is illuminated by illumination device 500, the image of the person will not appear in the image output from camera server 600. Therefore, privacy of that person can be protected. In contrast, a person that is not illuminated by illumination device 500 will appear in the image output from camera server 600. By applying the mosaic process only on the region required for privacy protection, more information of the output image can be retained.

Object 130 can be avoided from being constantly illuminated by providing illumination from illumination device 500 only when extraction is to be made of the illuminated region by illumination detection unit 603.

Infrared light is advantageous as the light to be emitted from illumination device 500 since infrared light is not visible for object 130.

Fifth Embodiment

FIG. 36 shows a schematic structure of an image processing apparatus according to a fifth embodiment of the present invention.

Referring to FIG. 36, an image processing apparatus 650 includes a control unit 601 providing the entire control of image processing apparatus 650, a communication control unit 113 to allow control unit 601 to communicate with a personal computer or the like connected to the network, a pattern illumination unit 651 projecting patterned light of gradations or stripes, an illumination pan-tilt unit 503 to alter the illuminating direction of pattern illumination unit 651, an illumination control unit 655 controlling pattern illumination unit 651 and illumination pan-tilt unit 503, a camera unit 103 shooting an object 130, a camera pan-tilt unit 105 altering the shooting direction of camera unit 103, an illumination detection unit 603 to extract a region illuminated by pattern illumination unit 651 from the image data output from camera unit 103, and an image processing unit 605 carrying out a predetermined image process on a region illuminated by pattern illumination unit 651 in the image data output from camera unit 103.

The image processing apparatus of the fifth embodiment has illumination device 500 and camera server 600 of the fourth embodiment formed integrally. Components identical to or corresponding to those of the fourth embodiment have the same reference characters allotted, and description thereof will not be repeated.

Pattern illumination unit 251 is formed of an illumination unit and a light adjustment unit. The illumination unit projects patterned light of gradations or stripes. The illumination unit is formed of a lamp that projects light in all directions and a filter. The light projected from the lamp emits patterned light by passing through the filter. The patterned light can be rendered to light of gradated pattern or stripe pattern by altering the filter. The light adjustment unit corresponds to that similar to light adjustment unit 501 of the fourth embodiment. By altering the shape of the light adjustment unit, the size of the range illuminated by the pattern light emitted from the illumination unit can be altered.

Illumination control unit 655 is connected to illumination pan-tilt unit 503 and pattern illumination unit 651. Illumination control unit 655 is connected to a receiver unit 656. Receiver unit 656 carries out communication with a remote controller 657 through radio. A command signal to control pattern illumination unit 651 and illumination pan-tilt unit 503 at illumination control unit 655 is transmitted from remote controller 657 to receiver unit 656. Remote controller 657 is operated by object 130 or the person who is in the position protecting object 130.

Upon receiving a command signal from remote controller 657 at receiver unit 656, illumination control unit 655 transmits a control command to illumination pan-tilt unit 503 or pattern illumination unit 651 according to the received command signal. The control command transmitted to pattern illumination unit 651 is a command to specify the size of the illumination range. The control command transmitted to illumination pan-tilt unit 503 is a control command to specify the illumination direction of pattern illumination unit 651.

Illumination pan-tilt unit 503 shifts the illuminating direction according to the control command received from illumination control unit Pattern illumination unit 651 alters the emitting angle of the pattern light according to the control command received from illumination control unit 655. Illumination pan-tilt unit 503 and pattern illumination unit 651 are controlled by illumination control unit 655 according to the operation of remote controller 657 by object 130 or a person who is in the position to protect object 130, whereby the range and size illuminated by pattern illumination unit 651 are altered.

Pattern illumination unit 651 and illumination pan-tilt unit 503 can also be controlled by connecting an illumination operation unit to illumination control unit 655 which is operated by object 130 or a person who is in the position to protect object 130 in addition to remote controller 657.

Control unit 654 communicates with a personal computer or the like connected to the network via communication control unit 113 to receive a command that alters the shooting range of camera unit 103. According to the received command, control unit 654 transmits a control command to alter the shooting direction of camera unit 103 towards camera pan-tilt unit 105. In response to the control command received from control unit 654, camera pan-tilt unit 105 alters the shooting direction of camera unit 103. According to the command received from the computer or the like connected to the network via communication control unit 113, control unit 654 transmits a control command corresponding to the focus, zoom and iris towards camera unit 103. According to the control command received from control unit 654, camera unit 103 determines the focus value, the zoom amount, and the iris value. Accordingly, the range shot by camera unit 103 is controlled. The image data output from camera unit 103 is send to illumination detection unit 652.

Illumination detection unit 652 extracts the region illuminated by pattern illumination unit 651 as the illumination region from the image data. Image processing unit 653 carries out an image processing process such as a mosaic process on the region illuminated by pattern illumination unit 651 in the image data.

The process carried out by image processing device 650 of the present embodiment is similar to the process described in the fourth embodiment with reference to FIGS. 24–27 and 32, provided that the luminance data obtained from the image data output from camera unit 103 differs from the luminance data described in the fourth embodiment since the light emitted from pattern processing unit 651 is light of gradated or stripe pattern.

Figure 37A:
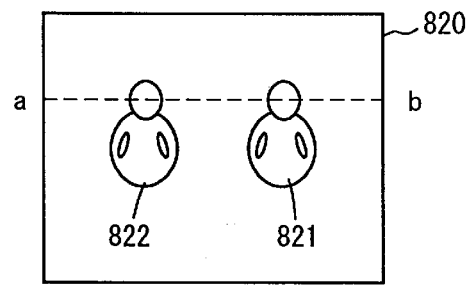
FIGS. 37A–37D are diagrams to describe an illumination detection process in the case of using pattern illumination.
Figure 37B:
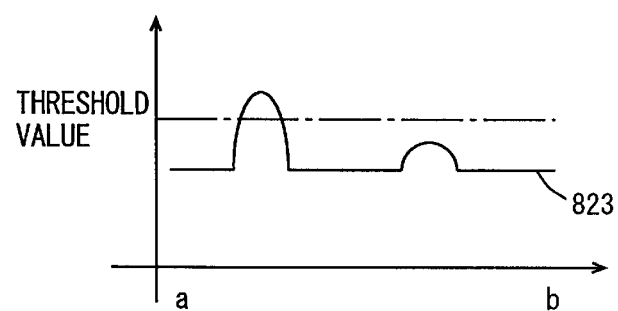
Figure 37C:
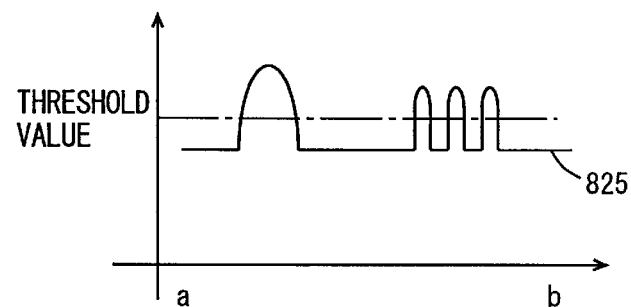
Figure 37D:
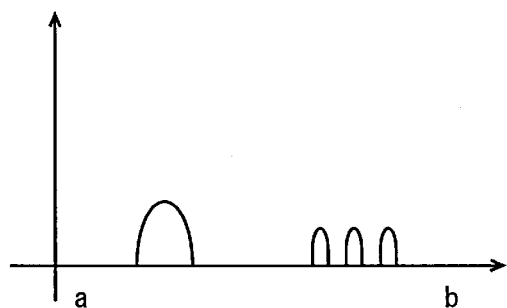

FIG. 37A shows image data obtained when not illuminated by the illumination device. FIG. 37B shows luminance data at a horizontal line a-b in image data 820 of FIG. 37A. As to luminance data 823, the luminance value of object 822 is higher than the threshold value whereas the luminance value of object 821 is lower than the threshold value. FIG. 37C represents luminance data obtained when object 821 is illuminated by the pattern illumination unit. As to luminance data 825, the luminance values corresponding to the stripe in the region of object 821 is greater than the threshold value. FIG. 37D represents data greater than the threshold value regarding luminance data. The profile of the data is analyzed by illumination detection unit 652. By deriving the portion corresponding to a predetermined pattern, the region of object 821 in image data 820 can be extracted as the illuminated region.

According to the image processing apparatus of the fifth embodiment, a pattern illumination unit 651 is provided to emit patterned light. Therefore, an object illuminated by the patterned light can be easily extracted from the image data.

Sixth Embodiment

Figure 38:
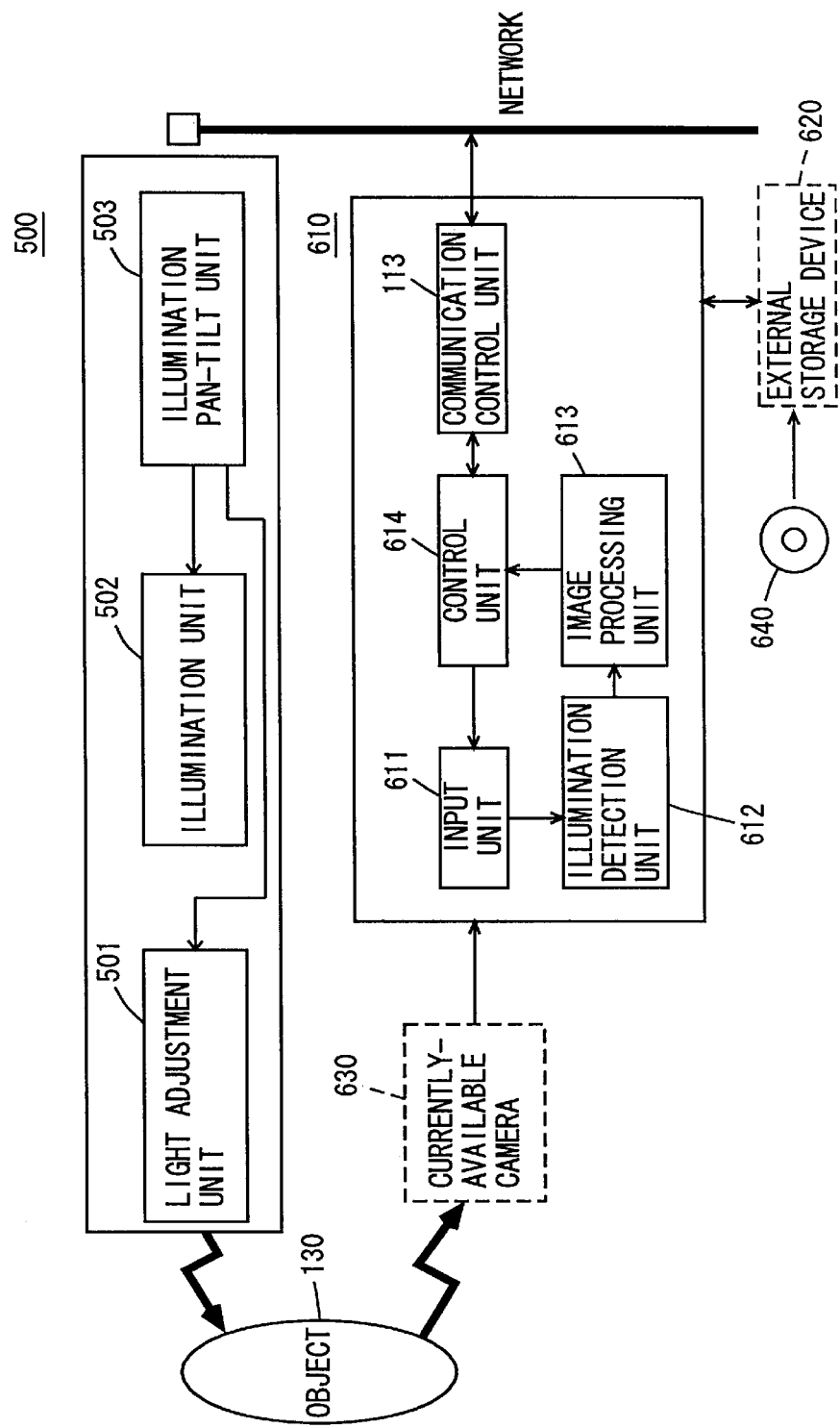
FIG. 38 is a block diagram showing a schematic structure of an image processing system according to a sixth embodiment of the present invention.

FIG. 38 is a block diagram showing the schematic structure of an image processing system according to a sixth embodiment of the present invention. The image processing system of the sixth embodiment includes mainly an illumination device 500, a currently-available camera 630, and an image processing apparatus 610.

Illumination device 500 is identical to that of the fourth embodiment. Therefore, description thereof will not be repeated. Currently-available camera 630 is a conventional monitor camera, which is fixed. An image shot by conventional camera 230 is converted into electric signals and applied to image processing apparatus 610.

Image processing apparatus 610 includes a control unit 614 providing the entire control of image processing apparatus 610, an input unit 611 entering image data from currently-available camera 630, a communication control unit 113 for control unit 614 to communicate with a personal computer or the like connected to the network, an illumination detection unit 612 extracting a region illuminated by illumination device 500 from the image data input at input unit 611, and an image processing unit 613 carrying out a predetermined image conversion process on the region illuminated by illumination device 500 in the image data.

Illumination detection unit 612 carries out the illumination detection process shown in FIG. 27 described with reference to the fourth embodiment or the illumination detection process shown in FIG. 34. Image processing unit 613 carries out an image conversion process of FIG. 32 described in the fourth embodiment.

Since the range shot by currently-existing camera 630 is fixed, the image data input to input unit 611 is an image of a fixed shooting range. Object 130 can operate illumination device 500 to enter himself/herself in the illumination range illuminated by illumination unit 502.

Illumination detection unit 612 detects the illumination region illuminated by illumination device 500 from the input image data. Image processing unit 613 applies a mosaic process on the image data of the region illuminated by illumination device 500 in the image data. The image data subjected to the mosaic process is transmitted to control unit 614. Control unit 614 transmits the image data subjected to the mosaic process to a computer or the like connected to the network via communication control unit 113. The image data subjected to the mosaic process is displayed at the personal computer side.

The image processing apparatus of the sixth embodiment can apply a mosaic process exclusively on the image data of the region illuminated by illumination device 500 out of the image data input from currently-available camera 630.

Since image processing can be applied on the image shot by a currently-available camera, an image processing system can be developed by only a simple improvement to the existing facility.

The program executing the processes shown in FIG. 27 or 34 and FIG. 32 can be recorded in a recording medium 640 and read out by an external storage device 620 connected to image processing apparatus 610 to be executed at control unit 614. Recording medium 640 is a magneto-optical disk, a digital video disk (DVD), or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
an image input unit capturing an image,
a detection unit to detect an object from the image captured by said image input unit,
a storage unit to store data regarding a predetermined configuration,
a comparison unit to compare a configuration of said object detected by said detection unit with said predetermined configuration data stored in said storage unit, and
an image processing unit to convert at least part of said captured image into an image differing from said captured image when the configuration of said object is analogous to said predetermined configuration as a result of the comparing.

2. The image processing apparatus according to claim 1, wherein said detection unit detects a particular object included in said captured image.

3. The image processing apparatus according to claim 2, wherein said particular object is a marker.

4. The image processing apparatus according to claim 1, further comprising a distance measurement unit to measure a distance between said object and the image processing apparatus, wherein said image processing unit determines a region of the captured image to be processed according to the distance measured by said distance measurement unit.

5. The image processing apparatus according to claim 1, further comprising a connection unit to connect with a network, whereby the converted image is transmitted to said network.

6. The image processing apparatus according to claim 1, wherein said storage unit stores second predetermined configuration data differing from said predetermined configuration data.

7. The image processing apparatus according to claim 6, wherein said image processing unit converts said part of converted image into said captured image when the configuration of said object is analogous to said second predetermined configuration data stored in said storage unit.

8. The image processing apparatus according to claim 1, wherein said image processing unit applies a mosaic process on said part of the captured image.

9. A computer readable recording medium in which is recorded a program to cause a computer to execute the steps of:
storing data regarding a predetermined configuration,
capturing an image,
detecting an object from said captured image,
comparing a configuration of said detected object with said stored predetermined configuration, and
converting at least part of said captured image into an image differing from said captured image when the configuration of said object is analogous to said predetermined configuration as a result of the comparing.

10. An image processing system comprising:
an illumination device to emit light,
an image input unit to capture an image including an object illuminated by said illumination device,
a detection unit to detect said illuminated object from the captured image, and
an image processing unit to convert part of the captured image corresponding to said illuminated object detected by said detection unit into an image differing from said captured image.

11. The image processing system according to claim 10, wherein said illumination device is configured to alter an illuminating range.

12. The image processing system according to claim 10, wherein said illumination device emits light including infrared light.

13. The image processing system according to claim 10, wherein said illumination device emits first light having a wavelength in an infrared region and second light having a wavelength in a visible region.

14. The image processing system according to claim 10, wherein said detection unit detects said illuminated object by comparing the image captured by said image input unit when said illumination unit emits light and the image captured by said image input unit when said illumination unit does not emit light.

15. The image processing system according to claim 10, wherein said illumination device emits light with a pattern, and said detection unit detects said illuminated object by detecting said pattern projected onto the object.

16. The image processing system according to claim 10, wherein said image processing unit applies a mosaic process on said part of the captured image.

17. A computer readable recording medium in which a program is recorded to cause a computer to execute the steps of:

capturing an image including an object illuminated with light of a predetermined wavelength range, detecting said illuminated object from the captured image, and converting part of the captured image corresponding to said illuminated object into an image differing from said captured image.

18. An image processing apparatus comprising:

an image input unit capturing an image, a detection unit detecting an indication of image conversion from the captured image, and an image processing unit converting part of the captured image corresponding to the indication into an image different from said part of the captured image prior to the converting.

19. An image processing apparatus comprising:

an image input unit capturing an image, a storage unit storing data regarding a predetermined pattern, a detection unit detecting the predetermined pattern in the captured image, and an image processing unit converting part of the captured image corresponding to the detected predetermined pattern into an image different from said part of the captured image prior to the converting.

* * * * *